(12) United States Patent  
Lee et al.

(10) Patent No.: US 8,514,798 B2
(45) Date of Patent: Aug. 20, 2013

(54) METHODS FOR SCHEDULING CHANNEL ACTIVITIES FOR MULTIPLE RADIO ACCESS TECHNOLOGIES IN A COMMUNICATIONS APPARATUS AND COMMUNICATIONS APPARATUSES UTILIZING THE SAME

(75) Inventors: Chun-Sheng Lee, Zhubei (TW); Chin-Fa Hsu, Zhubei (TW)

(73) Assignee: MediaTek Inc., Hsin-Chu (TW)

( * ) Notice: Subject to any disclaimer, the term of this patent is extended or adjusted under 35 U.S.C. 154(b) by 271 days.

(21) Appl. No.: 12/873,555

(22) Filed: Sep. 1, 2010

(65) Prior Publication Data

US 2011/0205984 A1  Aug. 25, 2011

Related U.S. Application Data

(60) Provisional application No. 61/307,895, filed on Feb. 25, 2010.

(51) Int. Cl.
  *H04W 4/00* (2009.01)
(52) U.S. Cl.
  USPC ........... 370/329; 230/230; 230/235; 230/338; 230/348
(58) Field of Classification Search
  USPC .................. 370/235, 230, 238, 248, 455, 329
  See application file for complete search history.

(56) References Cited

U.S. PATENT DOCUMENTS

| 7,047,034 B2 * | 5/2006 | Norimatsu ................. 455/552.1 |
| 7,206,604 B2 | 4/2007 | Berra et al. |
| 7,546,404 B2 * | 6/2009 | Yeh et al. ....................... 710/117 |
| 7,949,812 B1 * | 5/2011 | Wong et al. ................... 710/240 |
| 8,045,922 B2 * | 10/2011 | Sherman et al. ............. 455/41.2 |
| 8,169,938 B2 * | 5/2012 | Duchscher et al. ........... 370/310 |
| 8,223,693 B2 * | 7/2012 | Ko et al. ....................... 370/328 |
| 2007/0238483 A1 | 10/2007 | Boireau et al. |

(Continued)

FOREIGN PATENT DOCUMENTS

| CN | 1976514 | 6/2007 |
| CN | 1997192 | 7/2007 |
| CN | 101005673 | 7/2007 |
| TW | 200941962 | 10/2009 |

OTHER PUBLICATIONS

English language translation of abstract of CN 1976514 (published Jun. 6, 2007).

(Continued)

*Primary Examiner* — Ian N Moore
*Assistant Examiner* — Phong La
(74) *Attorney, Agent, or Firm* — McClure, Qualey & Rodack, LLP

(57) ABSTRACT

An communications apparatus with multiple radio access technologies (RATs) is provided. A first RAT module transceives radio frequency (RF) signals in a first cellular network through the antenna. A second RAT module transceives RF signals in a second cellular network through the antenna. An arbiter receives a first and a second request from the first and second RAT module requesting permission to use the antenna for a first and a second channel activity, obtains a priority configuration for the first channel activity versus the second channel activity when the second channel activity collides with the first channel activity, and responds to one of the first and second RAT modules with an acknowledgement message and to the other of the first and second RAT modules with a rejection message based on the obtained priority configuration.

16 Claims, 18 Drawing Sheets

(56) References Cited

U.S. PATENT DOCUMENTS

| | | |
|---|---|---|
| 2008/0161030 A1 | 7/2008 | Pernu |
| 2008/0279264 A1* | 11/2008 | Desai et al. .................... 375/220 |
| 2008/0309490 A1* | 12/2008 | Honkanen et al. ......... 340/572.1 |
| 2009/0137206 A1* | 5/2009 | Sherman et al. ............. 455/41.2 |
| 2009/0245279 A1 | 10/2009 | Wan et al. |
| 2009/0258607 A1* | 10/2009 | Beninghaus et al. ........... 455/77 |
| 2009/0285167 A1* | 11/2009 | Hirsch et al. .................. 370/329 |
| 2010/0040033 A1* | 2/2010 | Xhafa et al. ................... 370/338 |
| 2010/0080177 A1* | 4/2010 | Rofougaran .................. 370/329 |
| 2010/0202416 A1* | 8/2010 | Wilhelmsson et al. ....... 370/336 |
| 2010/0304770 A1* | 12/2010 | Wietfeldt et al. ............. 455/509 |
| 2010/0316027 A1* | 12/2010 | Rick et al. .................... 370/336 |
| 2010/0331029 A1* | 12/2010 | Linsky et al. ................. 455/509 |
| 2011/0007675 A1* | 1/2011 | Chiou et al. .................. 370/297 |
| 2011/0009074 A1* | 1/2011 | Hsu et al. ........................ 455/73 |
| 2011/0039554 A1* | 2/2011 | Bims ............................. 455/434 |
| 2011/0263214 A1* | 10/2011 | Robinson et al. ............... 455/88 |
| 2012/0076061 A1* | 3/2012 | Desai ............................ 370/311 |

OTHER PUBLICATIONS

English language translation of abstract of CN 1997192 (published Jul. 11, 2007).

English language translation of abstract of CN 101005673 (published Jul. 25, 2007).

* cited by examiner

| 1210 | | | | | | | | | | | | |
|---|---|---|---|---|---|---|---|---|---|---|---|---|
| D0 | D1 | D2 | D3 | D4 | D5 | D6 | D7 | A0 | A1 | A2 | A3 | -- |
| D0 | D1 | D2 | D3 | D4 | D5 | D6 | D7 | A4 | A5 | A6 | A7 | -- |

| 1212 | | | | | | | | | | | | |
|---|---|---|---|---|---|---|---|---|---|---|---|---|
| A5 | A6 | A7 | -- | D0 | D1 | D2 | D3 | D4 | D5 | D6 | D7 | A0 |
| A1 | A2 | A3 | -- | D0 | D1 | D2 | D3 | D4 | D5 | D6 | D7 | A4 |

| Channel type | | × | NBCCH/PCH | BCCH/AGCH | × | CBCH | FCB+SB/SCH/NBCCH |
|---|---|---|---|---|---|---|---|
| RAT 1 (WCDMA) | P-CCPCH_high | TOP | RAT 1 | RAT 1 | | RAT 1 | RAT 1 |
| | PICH | | HIGH | RAT 1 | | RAT 1 | RAT 1 |
| | × | | | M1 | | | |
| | P-CCPCH_med | | RAT 2 | RAT 2 | M2 | RAT 1 | RAT 1 |
| | CTCH | | RAT 2 | RAT 2 | | M3 | RAT 1 |
| | P-CCPCH_low | | RAT 2 | RAT 2 | | RAT 2 | LOW |

FIG. 15

METHODS FOR SCHEDULING CHANNEL ACTIVITIES FOR MULTIPLE RADIO ACCESS TECHNOLOGIES IN A COMMUNICATIONS APPARATUS AND COMMUNICATIONS APPARATUSES UTILIZING THE SAME

CROSS REFERENCE TO RELATED APPLICATIONS

This application claims the benefit of U.S. Provisional Application No. 61/307,895 filed 2010 Feb. 25 and entitled "Methods for coordinating radio activities requested by different radio access technologies (RAT) modules sharing a single antenna and systems using the same". The entire contents of which are hereby incorporated by reference.

BACKGROUND OF THE INVENTION

1. Field of the Invention

The invention relates to a method for scheduling channel activities for multiple radio access technologies (RATs) in a communications apparatus, and more particularly to a method for scheduling channel activities for multiple RATs in a communications apparatus when collision occurs.

2. Description of the Related Art

The term "wireless", normally refers to an electrical or electronic operation, which is accomplished without the use of a "hard wired" connection. "Wireless communications", is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Wireless Fidelity (Wi-Fi) is a technology defined by the 802.11 engineering standard and can be used for home networks, mobile phones, video games, to provide a high-frequency wireless local area network.

With the advanced development of wireless communications technologies, it is now possible to provide multiple wireless communications services using different or the same communications technologies in one mobile station (MS). In order to provide an efficient and reliable radio services, methods for coordinating radio activities in different radio access technologies is highly required.

BRIEF SUMMARY OF THE INVENTION

Communications apparatuses and methods for scheduling channel activities for multiple RATs in a communications apparatus are provided. An embodiment of a communications apparatus with multiple RATs comprises an antenna, a first RAT module, a second RAT module and an arbiter. The first RAT module with a first communications interface conforming to a first wireless communications protocol transceives radio frequency (RF) signals in a first cellular network through the antenna. The second RAT module with a second communications interface conforming to a second wireless communications protocol, which is different from the first wireless communications protocol, transceives RF signals in a second cellular network through the antenna. The arbiter receives a first request from the first RAT module, requesting permission to use the antenna for a first channel activity, receives a second request from the second RAT module, requesting permission to use the antenna for a second channel activity, obtains a priority configuration for the first channel activity versus the second channel activity when the second channel activity collides with the first channel activity, and responds to one of the first and second RAT modules with an acknowledgement message and to the other of the first and second RAT modules with a rejection message based on the obtained priority configuration.

Another embodiment of a method for scheduling channel activities for multiple RATs in a communications apparatus comprising an antenna, an arbiter and at least a first RAT module and a second RAT module sharing the antenna to perform corresponding channel activities, comprises: receiving, by the arbiter, a request for requesting permission to use the antenna for a first channel activity for the first RAT module; obtaining, by the arbiter, a priority configuration for the first channel activity versus a forthcoming second channel activity when the first channel activity collides with the forthcoming second channel activity to be performed by the second RAT module; and responding, by the arbiter, to the first RAT module by sending an acknowledgement message or a rejection message to the first RAT module based on the obtained priority configuration to indicate whether the request has been granted.

Another embodiment of a communications apparatus with multiple radio access technologies (RATs) comprises an antenna, a first RAT module, a second RAT module and an arbiter. The first RAT module with a first communications interface conforming to a first wireless communications protocol transceives radio frequency (RF) signals in a first cellular network through the antenna. The second RAT module with a second communications interface conforming to a second wireless communications protocol, which is different from the first wireless communications protocol, transceives RF signals in a second cellular network through the antenna. The arbiter receives a request from the first RAT module, requesting permission to use the antenna for a first channel activity, obtains a priority configuration for the first channel activity versus a second channel activity to be performed by the second RAT module when the second channel activity collides with the first channel activity, and responds to the first RAT module with an acknowledgement message or a rejection message based on the obtained priority configuration.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 12A to FIG. 12C show exemplary channel organizations in 51 multi-frame for GSM/GPRS;

FIG. 15 is a table showing an exemplary priority configuration for the WCDMA and GSM/GPRS channels;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

With mobile stations (MS, which may be interchangeably referred to as user equipments (UE)), now capable of handling different radio access technologies (RAT), such as at least two of GSM/GPRS/EDGE (Global System for Mobile Communications/General Packet Radio Service/Enhanced Data rates for Global Evolution), WCDMA (Wideband Code Division Multiple Access), cdma2000, WiMAX (Worldwide Interoperability for Microwave Access), TD-SCDMA (Time Division Synchronous Code Division Multiple Access), LTE (Long Term Evolution), and TD-LTE (Time Division Long Term Evolution) RATs, and the similar, an MS may locate two or more public land mobile network (PLMN) in different RATs when switched on. The public land mobile network (PLMN) is a wireless communications system intended for use by subscribers, such as an MS.

Figure 1:
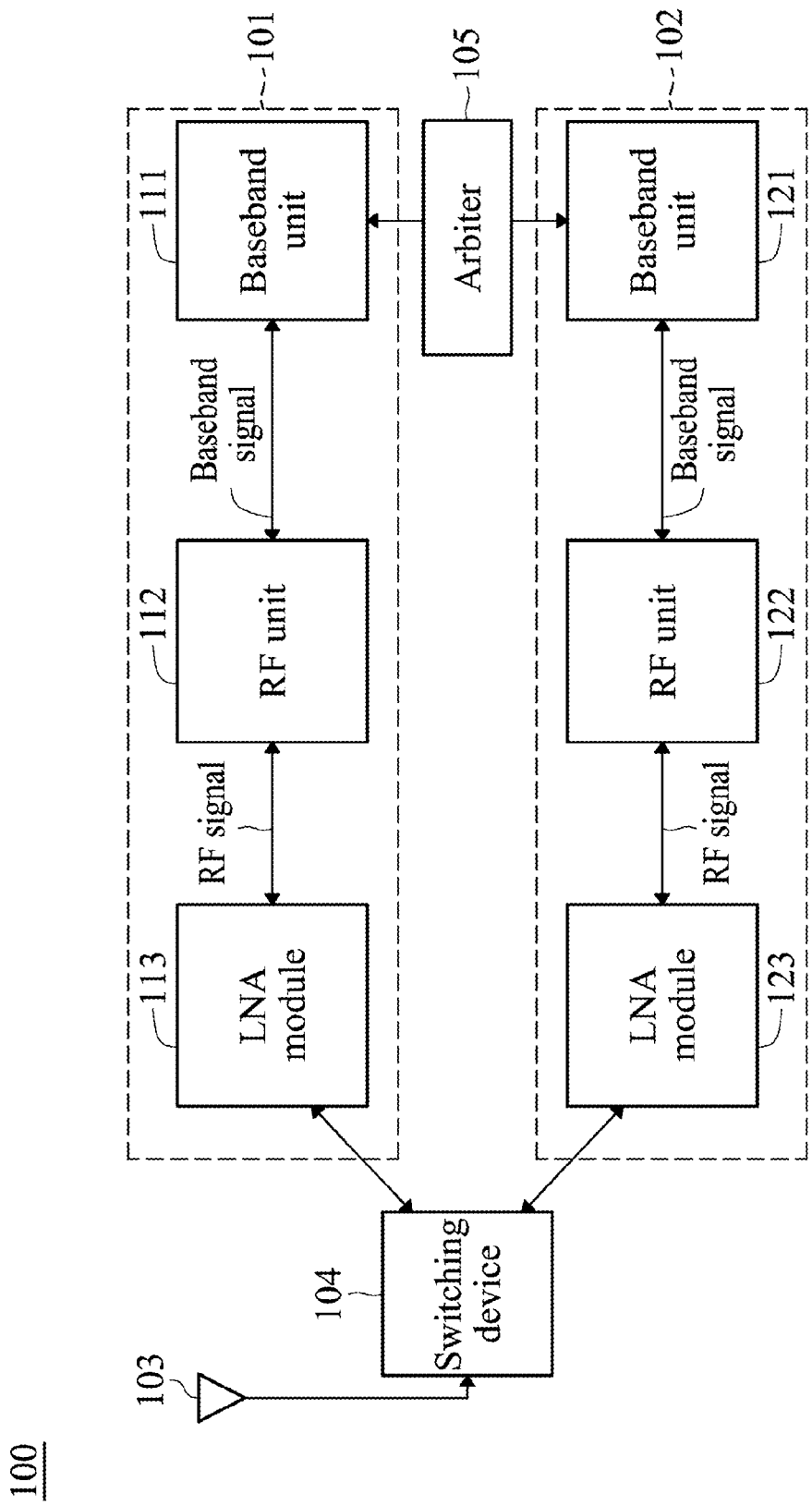
FIG. 1 shows a communications apparatus equipped with two different RAT modules according to an embodiment of the invention.

FIG. 1 shows a communications apparatus equipped with two different RAT modules according to an embodiment of the invention. The communications apparatus 100, which may be an MS, comprises two different RAT modules 101 and 102. Each RAT module having a communications interface conforming to a corresponding wireless communications protocol and transceiving radio frequency (RF) signals in a corresponding cellular network through the antenna may comprise a Baseband unit 111 or 121, a Radio Frequency (RF) unit 112 or 122 and a Low Noise Amplifier (LNA) module 113 or 123. Each of the Baseband units 111 and 121 may comprise a plurality of hardware devices to perform baseband signal processing. The baseband signal processing may comprise analog to digital conversion (ADC)/digital to analog conversion (DAC), gain adjusting, modulation/demodulation, encoding/decoding, and so on. Each of the RF units 112 and 122 may receive radio frequency wireless signals, convert the received signals to baseband signals, which are processed by a corresponding baseband unit, or receive baseband signals from a corresponding baseband unit and convert the received signals to radio frequency wireless signals, which are later transmitted. The RF unit may also comprise a plurality of hardware devices to perform radio frequency conversion. For example, the RF unit may comprise a mixer to multiply the baseband signals with a carrier oscillated in the radio frequency of the wireless communications system, wherein the radio frequency may be 900 MHz, 1800 MHz or 1900 MHz utilized in GSM systems, or may be 900 MHz, 1900 MHz or 2100 MHz utilized in WCDMA systems, or others depending on the RAT in use. Each of the LNA modules 113 and 123 may comprise one or more LNAs for amplifying the RF signals received from the antenna 103 based on the corresponding carrier frequency before being passed to the corresponding RF unit. The antenna 103 is arranged to transmit or receive the RF signals to or from the corresponding cellular network via the air interface for the corresponding RAT module.

According to the embodiments of the invention, the single antenna 103 is shared between different RAT modules 101 and 102. The switching device 104 is coupled between the shared antenna 103 and the LNA modules 113 and 123 and connects the shared antenna 103 to one of the LNA modules 113 and 123 so as to make the RF signals passing through the corresponding LNA to the destined RF unit. Generally, in a PLMN search procedure, the RAT module has to locate a suitable cell, which belongs to the corresponding PLMN of the RAT module, and camp on the suitable cell so as to use the wireless communications services provided by the PLMN. Because the single antenna 103 is shared between different RAT modules 101 and 102, the communications apparatus 100 may further comprise an arbiter 105 to coordinate radio activities requested by the RAT modules 101 and 102. With the coordinated radio activities for multiple RAT modules (such as the RAT modules 101 and 102) equipped in one communications apparatus, efficient and reliable radio services may be provided. Several embodiments of coordinating the radio activities between different RAT modules when sharing a single antenna will be given in the following paragraphs.

Figure 2:
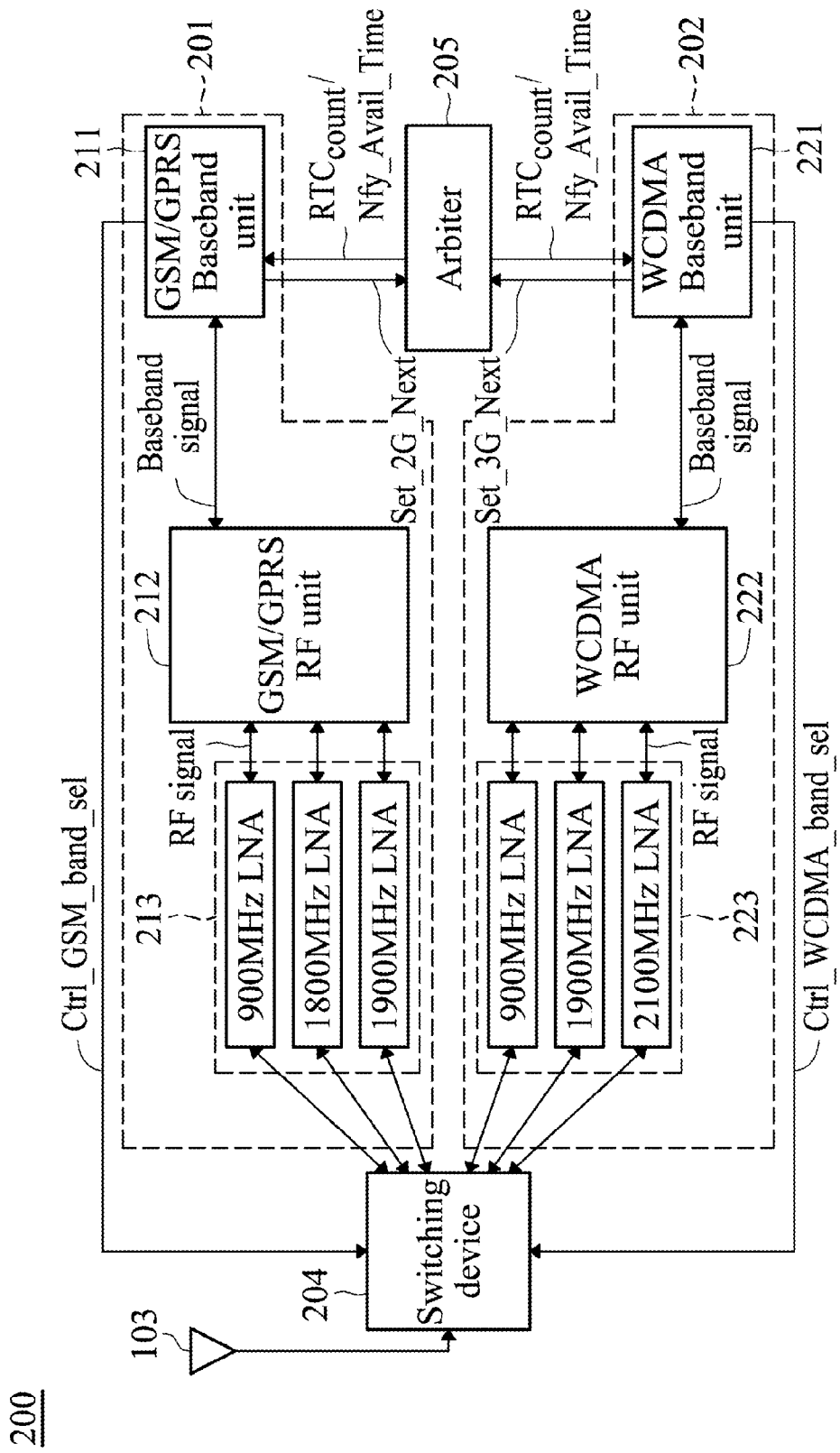
FIG. 2 shows a communications apparatus equipped with two different RAT modules according to an embodiment of the invention.

FIG. 2 shows a communications apparatus 200 equipped with two different RAT modules 201 and 202 according to an embodiment of the invention. Note that in this and the following embodiments, for illustration simplicity, the two RAT modules which are being used may respectively be a GSM/GPRS (also known as the second generation, 2G) communications module conforming to the GSM/GPRS communications protocol (also known as the second generation, 2G) and a WCDMA (also known as the third generation, 3G) communications module conforming to the WCDMA communications protocol. However, those skilled in the art will readily appreciate that concepts of the invention can also be applied to other RATs and the invention should not be limited thereto. In the embodiment of the invention, the LNA modules 213 and 223 may respectively comprise a plurality of LNAs each being designated for amplifying the RF signals of a corresponding 2G/3G band, where the 2G/3G band may be a 900 MHz, 1800 MHz, 1900 MHz, or 2100 MHz band, or others. The GSM/GPRS RF unit 212 or WCDMA RF unit 222 may measure the received RF signals and report to the GSM/GPRS Baseband unit 211 or WCDMA Baseband unit 221. Once one of the Baseband units attempt to perform a radio activity, such as a channel activity for transmitting or receiving information to or from the corresponding cell, or a measurement activity and performing a power scan or frequency scan of a serving cell or neighbor cell, or others, the Baseband unit making the attempt may issue a control signal Ctrl_GSM_band_sel or Ctrl_WCDMA_band_sel to the switching device 204 to direct the switching device 204 to connect the shared antenna to a designated LNA. The arbiter 205 is further arranged to coordinate and schedule radio activities requested by the RAT modules 201 and 202. Details of the hardware architecture and operation of the arbiter will be illustrated in the following paragraphs.

Figure 3:
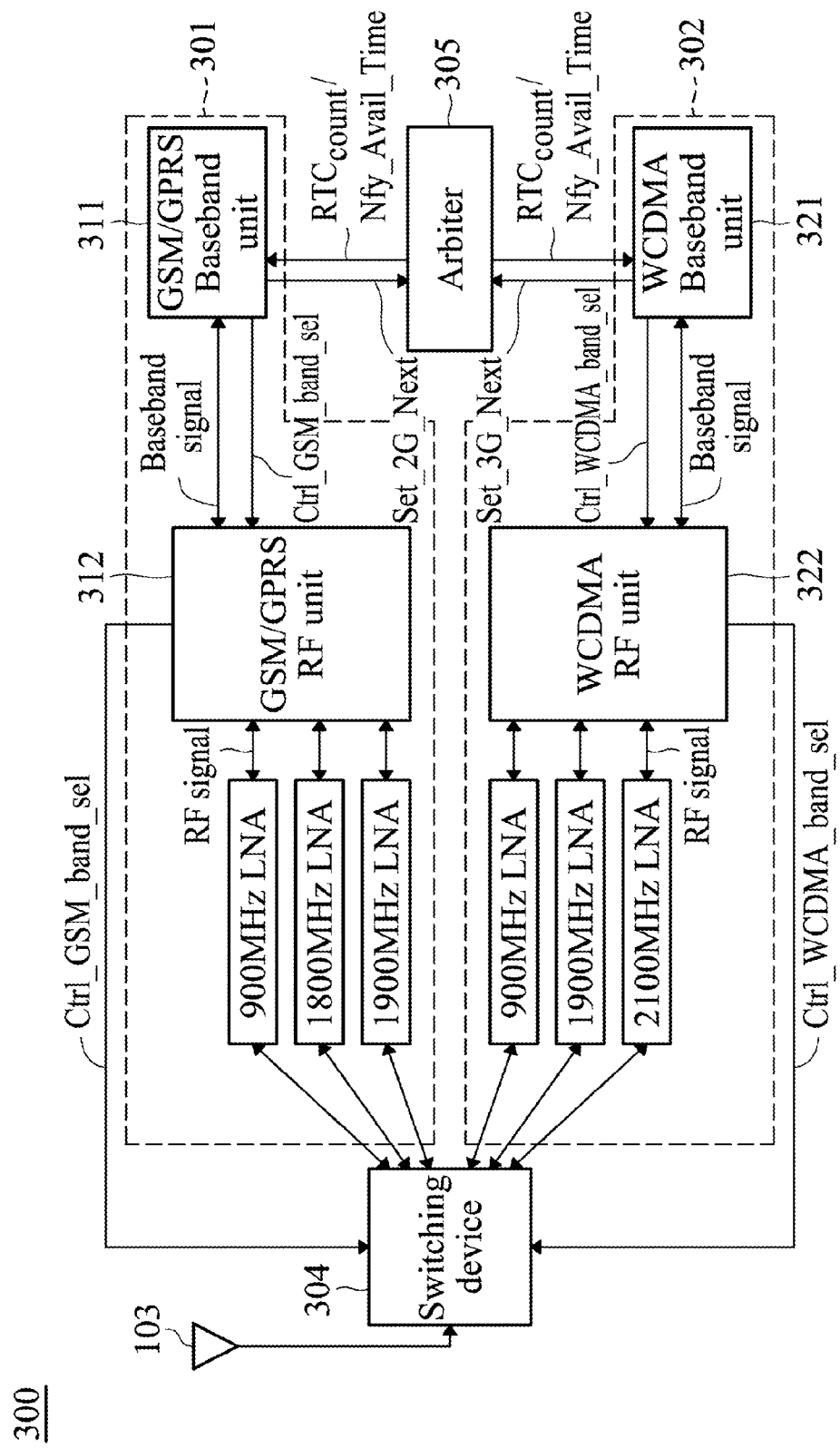
FIG. 3 shows a communications apparatus equipped with two different RAT modules according to another embodiment of the invention.

FIG. 3 shows a communications apparatus 300 equipped with two different RAT modules 301 and 302 according to another embodiment of the invention. Different from the hardware architecture as shown in FIG. 2, the GSM/GPRS Baseband unit 311 or WCDMA Baseband unit 321 issues the control signal to the switching device 304 via the corresponding GSM/GPRS RF unit 312 or WCDMA RF unit 322. Specifically, the GSM/GPRS RF unit 312 or WCDMA RF unit 322 controls the switching device 304 to connect the shared antenna to a designated LNA in terms of a control signal Ctrl_GSM_band_sel or Ctrl_WCDMA_band_sel from its corresponding GSM/GPRS Baseband unit 311 or WCDMA Baseband unit 321. The arbiter 305 is further arranged to coordinate and schedule radio activities requested by the RAT modules 301 and 302. Details of the hardware architecture and operation of the arbiter will be illustrated in the following paragraphs.

Figure 4:
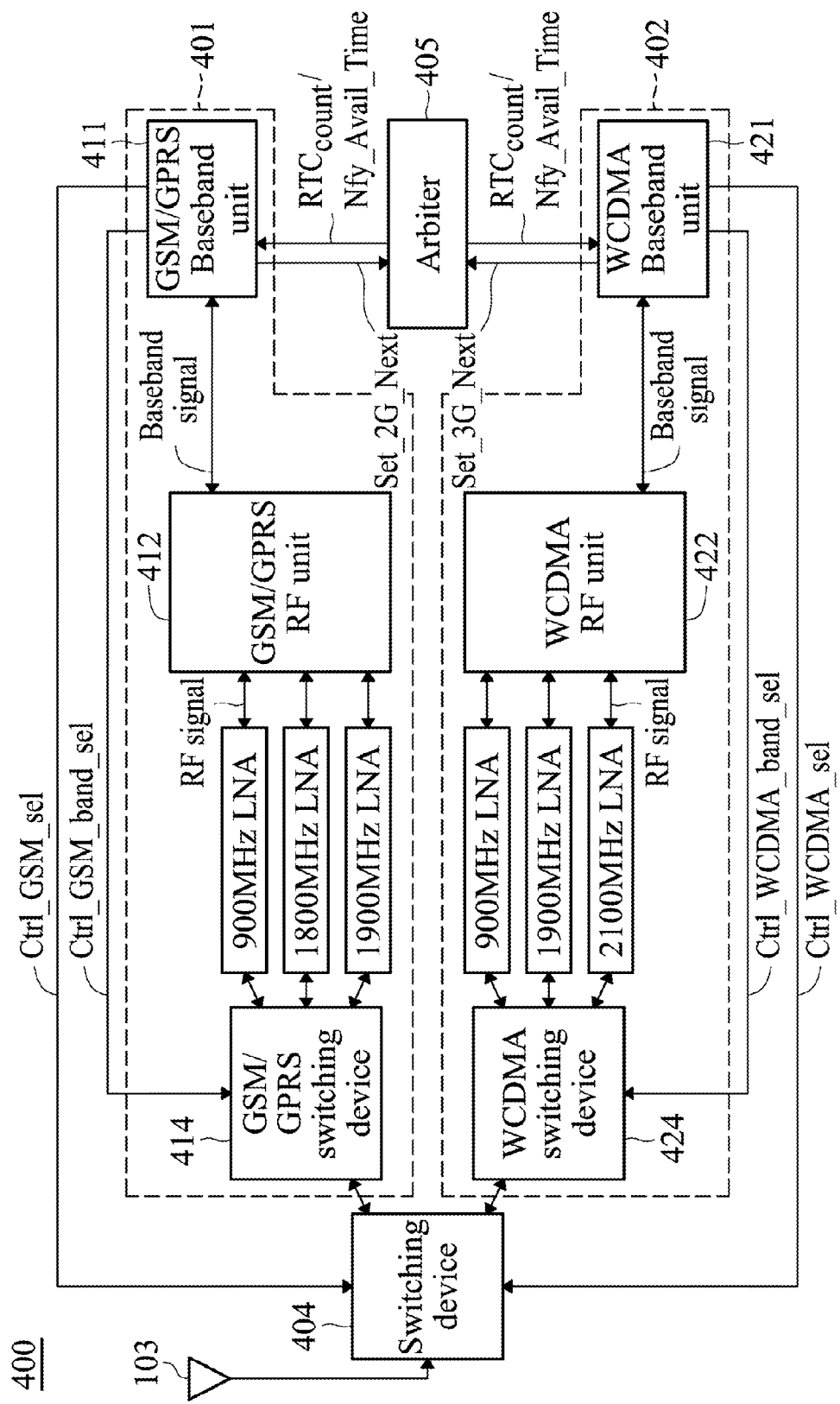
FIG. 4 shows still a communications apparatus equipped with two different RAT modules according to still another embodiment of the invention.

FIG. 4 shows still a communications apparatus 400 equipped with two different RAT modules 401 and 402 according to still another embodiment of the invention. The one-layer switching architecture as shown in FIG. 1 to FIG. 3 may be modified to a two-layer switching architecture. A first-layer switching device 404 is coupled between the shared antenna and second-layer switching devices to connect the antenna to one of the second-layer switching devices, such as the GSM/GPRS switching device 414 and WCDMA switching device 424. The GSM/GPRS switching device 414 is coupled between the first-layer switching device and multiple GSM band LNA to connect the first-layer switching device 404 to one designated GSM band LNA. Similarly, the WCDMA switching device 424 is disposed to connect the first-layer switching device 404 to one designated WCDMA band LNA. Once the baseband unit 411 or 421 attempts to perform a radio activity, it issues a control signal Ctrl_GSM_sel or Ctrl_WCDMA_sel to direct the first-layer switching device 404 to connect the shared antenna to one of the GSM and WCDMA switching devices 414 and 424, as well as, issues a control signal Ctrl_GSM_band_sel or Ctrl_WCDMA_band_sel to the corresponding switching device to connect to a designated LNA. The arbiter 405 is further arranged to coordinate and schedule radio activities requested by the RAT modules 401 and 402. Details of the hardware architecture and operation of the arbiter will be illustrated in the following paragraphs.

Figure 5:
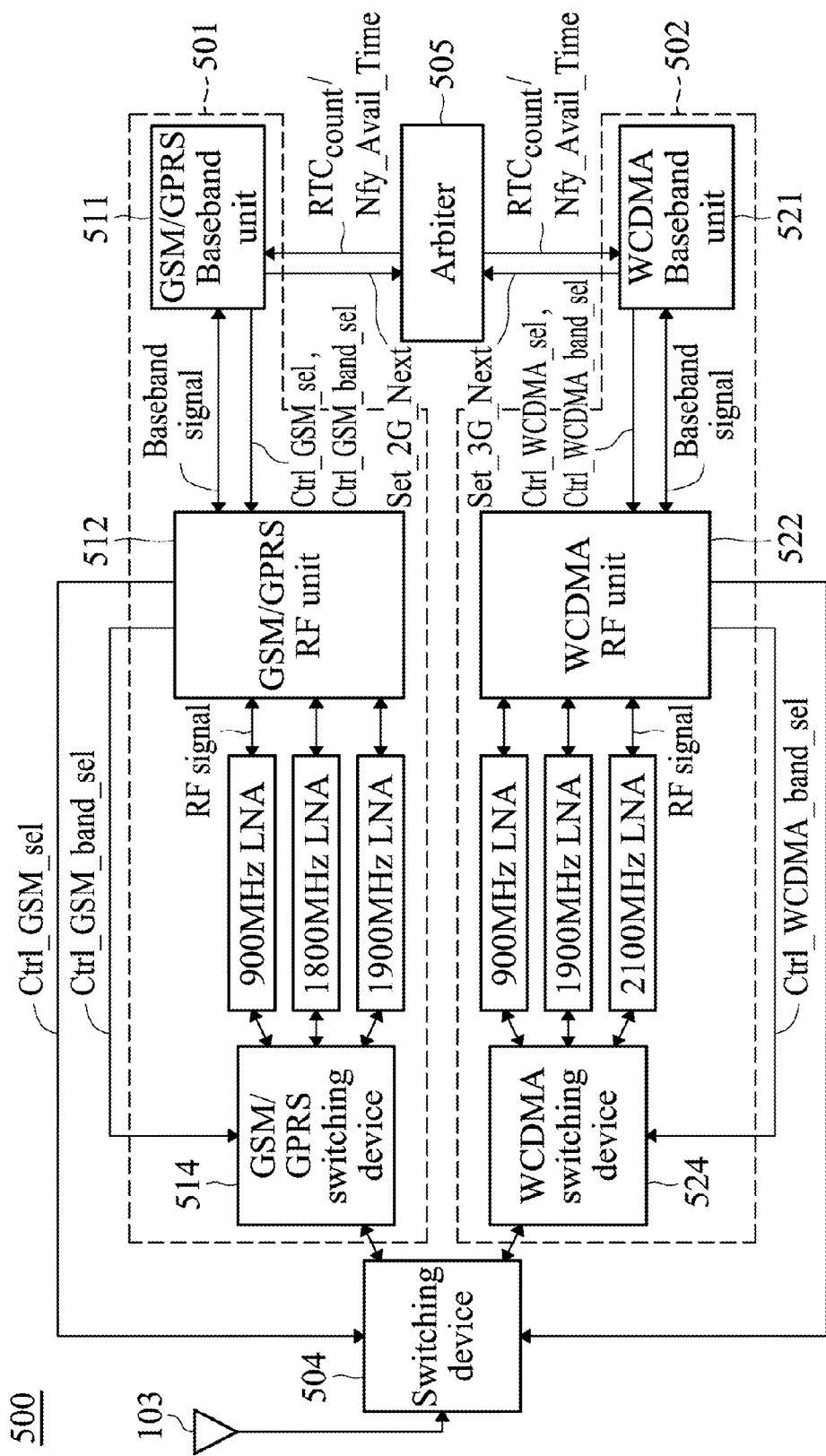
FIG. 5 shows still a communications apparatus equipped with two different RAT modules according to still another embodiment of the invention.

FIG. 5 shows still a communications apparatus 500 equipped with two different RAT modules 501 and 502 according to still another embodiment of the invention. Different from the hardware architecture as shown in FIG. 4, the GSM/GPRS baseband unit 511 and WCDMA baseband unit 521 issue the corresponding control signals Ctrl_GSM_sel/Ctrl_WCDMA_sel and Ctrl_GSM_band_sel/Ctrl_WCDMA_band_sel to the GSM and WCDMA switching devices 504, 514 and 524 via respective corresponding RF units 512 and 522. Specifically, an RF unit controls the switching devices 504, 514 and 524 to connect the shared antenna to a designated LNA in turn according to control signals Ctrl_GSM_sel/Ctrl_WCDMA_sel and Ctrl_GSM_band_sel/Ctrl_WCDMA_band_sel from its corresponding baseband unit 511 or 521. The arbiter 505 is further arranged to coordinate and schedule radio activities requested by the RAT modules 501 and 502. Details of the hardware architecture and operation of the arbiter will be illustrated in the following paragraphs.

Figure 6:
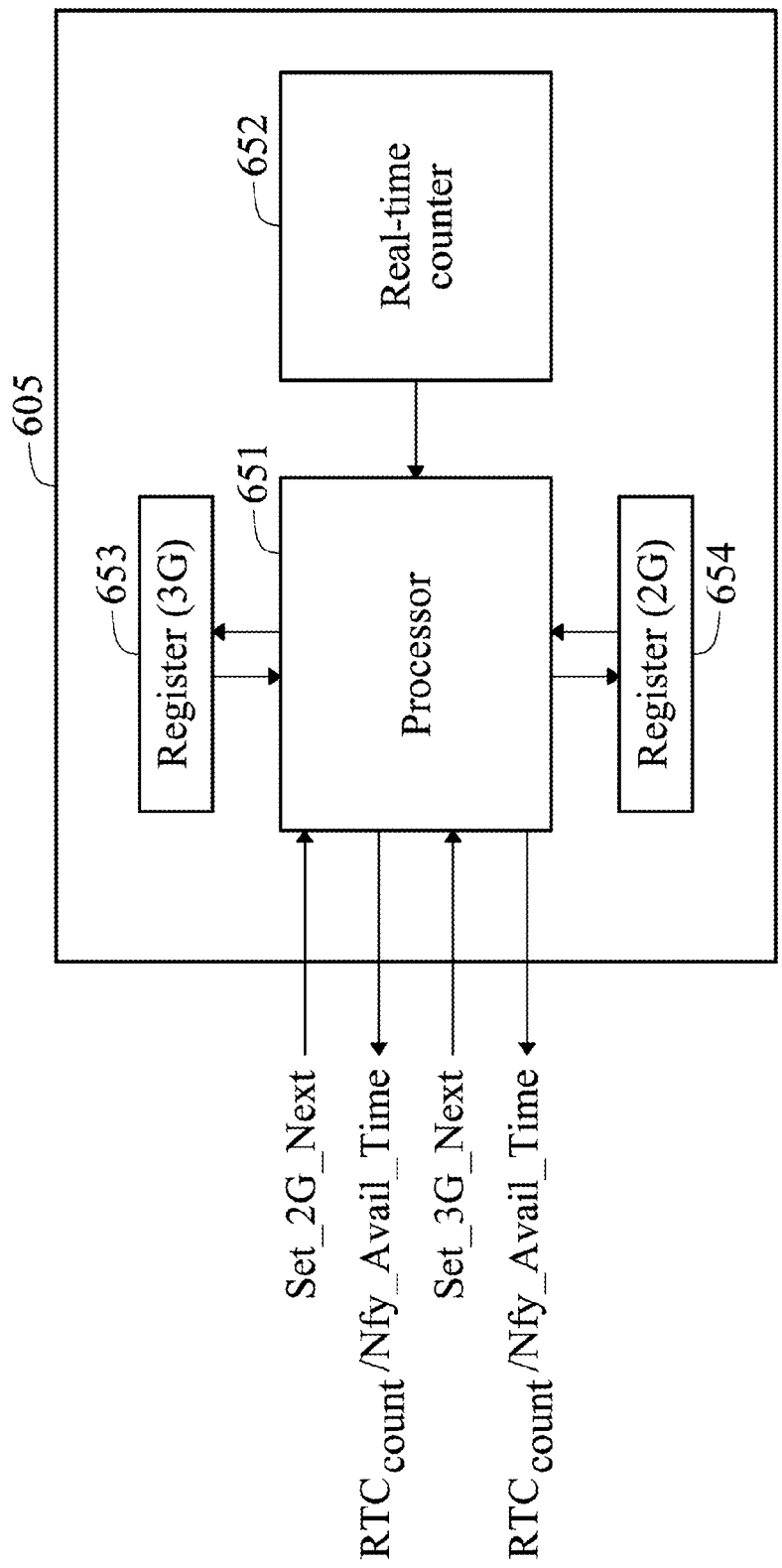
FIG. 6 shows a block diagram of an arbiter according to an embodiment of the invention.
Figure 7:
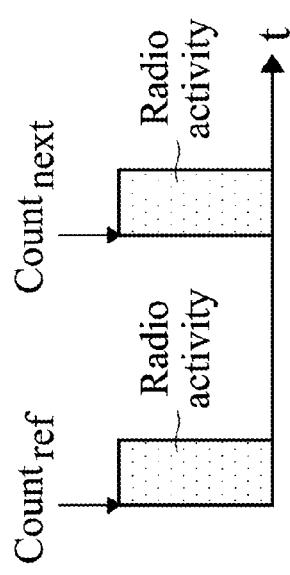
FIG. 7 is a timing diagram showing the start time of a current radio activity and a forthcoming radio activity.

FIG. 6 shows a block diagram of an arbiter according to an embodiment of the invention. According to an aspect of the invention, the arbiter 605 is implemented to facilitate scheduling of radio activities in a coordinated manner for different RAT modules. A real-time counter (RTC) 652 installed in the arbiter 605 comprises a free running clock with a specific frequency, such as 3.25 Mhz when enabled. Those skilled in the art may understand that the 3.25 Mhz is configured to support a ⅓ quarter bit (qbit) resolution (where 1 qbit=12/13 µs, therefore, ⅓ qbit=4/13 µs). A real time base (RTB) software module, when executed by a processor 651 of the arbiter 605, provides an interface to interact with the Baseband units of different RAT modules, such as the GSM/GPRS Baseband unit and WCDMA Baseband unit as illustrated above. The RTB software module may provide the current count value $RTC_{count}$ to the RAT modules as a reference count (e.g. $Count_{ref}$ as shown in FIG. 7). Note that the arbiter may also be integrated into either of the RAT modules and the invention should not be limited thereto.

According to the embodiments of the invention, each time a RAT module plans to perform a radio activity, such as a transmission (Tx) or a reception (Rx) channel operation, the start time of a next channel activity is also reported to the arbiter 605 by issuing a timing set command, such as the Set_2G_Next or Set_3G_Next shown in FIG. 6. It is to be understood that the Baseband units or the arbiter may convert the time of the forthcoming channel activity into counts based on a previously received reference count. The reported start time may be represented by an absolute count value (e.g. $Count_{next}$ as shown in FIG. 7), which is determined with reference to the received reference count (e.g. $Count_{ref}$ as shown in FIG. 7). For example, the GSM/GPRS or WCDMA Baseband unit, or the arbiter may convert the 2G or 3G frame length to the next channel activity into counts based on a previously received reference count. According to an embodiment of the invention, when one of the RAT modules is a WCDMA (3G) module, and when a 3.25 Mhz RTC is running in the arbiter 605, the absolute count value for the start time of a forthcoming (i.e. a next) 3G radio activity may be calculated by the following equation, $$Count_{next} = Count_{ref} + (X - RTB\_SYNC\_WTIME\_FN) * 32500 + \quad \text{Eq. (1)}$$
$$(Y - RTB\_SYNC\_WTIME\_ECHIPS) * 325/3072,$$

where X represents a specific frame number of a WCDMA frame, in which the next radio activity is performed, RTB_SYNC_WTIME_FN represents a specific frame number of a WCDMA frame, in which the sync timing procedure is performed, Y represents an offset from the beginning of the (X)-th WCDMA frame to the start time of the next radio activity, and RTB_SYNC_WTIME_ECHIPS represents an offset from the beginning of the (RTB_SYNC_WTIME_FN)-th WCDMA frame to the time performing the sync timing procedure SYNC_TIME_WCDMA. According to the embodiments of the invention, the above-mentioned sync timing procedure may be periodically performed. In a sync timing procedure, the arbiter 605 may read the current count value of the RTC 652, and the RTB software module may directly provide (or with some mathematic transformation on) the currently read count value $RTC_{count}$ of the RTC 652 as the reference count (e.g. $Count_{ref}$ as shown in FIG. 7). Note that the one of ordinary skill in the art will readily appreciate that the above-mentioned sync timing procedure may also be usually (that is, no need to be periodically) performed, and the invention should not be limited thereto.

Figure 9:
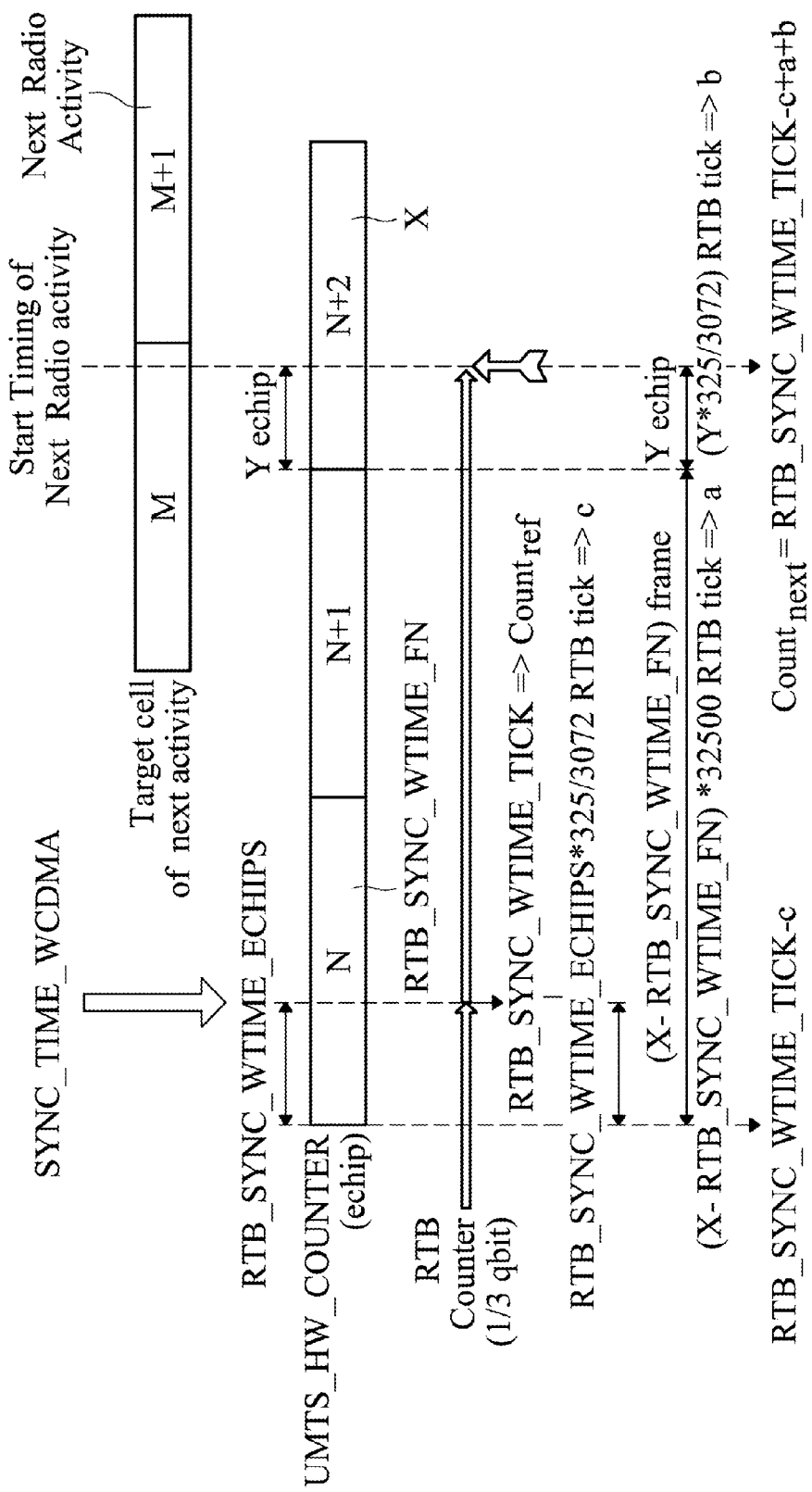
FIG. 9 is a timing diagram showing the mapping relationship between a WCDMA counter and a common RTB counter.

FIG. 9 is a timing diagram showing the mapping relationship between a WCDMA counter and a common RTB counter. The UMTS_HW_COUNTER with echip resolution (echip=⅛ chip=1/30.72 μs) is the WCDMA counter maintained by the WCDMA module to provide a system clock for the WCDMA module, where the system clock is synchronized with the WCDMA cellular network for transceiving information therebetween. According to the embodiment of the invention, the RTB counter with a ⅓ quarter bit (qbit) resolution (=4/13 μs) is not necessarily to be finer than that of the WCDMA system clock, and may still be provided as a common counter maintained by the processor 651 of the arbiter 605 to coordinate the timing between different RAT modules (for example, WCDMA and GSM/GPRS modules in this embodiment). As shown in FIG. 9, RTB_SYNC_WTIME_TICK represents the current count value $Count_{ref}$ of the RTB counter read in the current sync timing procedure preformed at the time as indicated by SYNC_TIME_WCDMA, X is the frame number of a WCDMA frame in which the next radio activity is performed, and RTB_SYNC_WTIME_FN is the frame number of a WCDMA frame in which the sync timing procedure is performed. Y is an offset from the beginning of the (X)-th WCDMA frame to the start time of the next radio activity, and is further converted from the time scale of the UMTS_HW_COUNTER to the time scale of the RTB counter as (Y*325/3072) RTB tick (represented by the parameter 'b' for simplicity) so as to represent the corresponding count value of the RTB counter. RTB_SYNC_WTIME_ECHIPS is an offset from the beginning of the (RTB_SYNC_WTIME_FN)-th WCDMA frame to time of performing the sync timing procedure SYNC_TIME_WCDMA, and is further converted from the time scale of the UMTS_HW_COUNTER to the time scale of the RTB counter as (RTB_SYNC_WTIME_ECHIPS*325/3072) RTB tick (represented by the parameter 'c' for simplicity) so as to represent the corresponding count value of the RTB counter. (X-RTB_SYNC_WTIME_FN) is the difference of frame numbers between the forthcoming WCDMA frame which has a next radio activity and the WCDMA frame in which the current sync timing procedure is performed, and is further converted to the time scale of the RTB counter as (X-RTB_SYNC_WTIME_FN)*32500 RTB tick (represented by the parameter 'a' for simplicity) so as to represent the corresponding count value of the RTB counter. Finally, the count value $Count_{next}$ of the next WCDMA radio activity represented of in the time scale of the RTB counter is obtained by computing (RTB_SYNC_GTIME_TICK−c+a+b) as given in Eq. (1). According to the embodiment of the invention, since the sync timing procedure may be regularly or usually performed so as to refresh the reference count read from the RTC 652, the rounding error when performing the timing base conversion, as shown in Eq. (1) or Eq. (2), may not be unlimitedly accumulated to cause the conversion error.

According to another embodiment of the invention, when one of the RAT modules is a GSM/GPRS (2G) module, and when a 3.25 Mhz RTC is running in the arbiter 605, the absolute count value for a 2G radio activity may be calculated by the following equation, $$Count_{next} = Count_{ref} + (X - RTB\_SYNC\_GTIME\_FN) * 15000 + \quad \text{Eq. (2)}$$
$$(Y - RTB\_SYNC\_GTIME\_EBITS) * 3/2,$$

where X represents a specific frame number of a GSM frame, in which the next radio activity is performed, RTB_SYNC_GTIME_FN represents a specific frame number of a GSM frame, in which the sync timing procedure is performed, Y represents an offset from the beginning of the (X)-th GSM frame to the start time of the next radio activity, and RTB_SYNC_GTIME_EBITS represents an offset from the beginning of the (RTB_SYNC_GTIME_FN)-th GSM frame to the time of performing the sync timing procedure SYNC_TIME_GSM.

Figure 10:
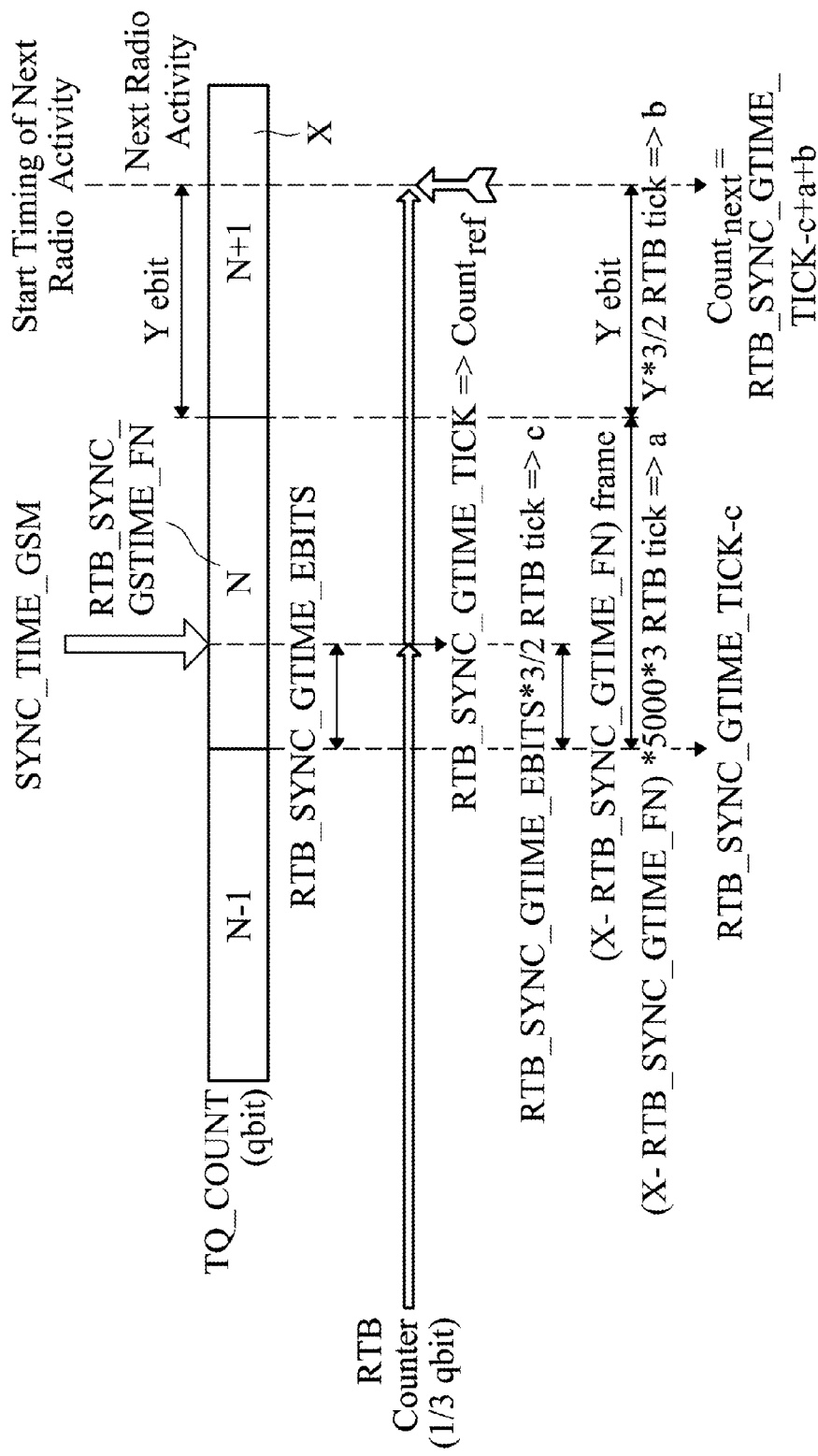
FIG. 10 is a timing diagram showing the mapping relationship between a GSM/GPRS counter and a common RTB counter.

FIG. 10 is a timing diagram showing the mapping relationship between a GSM/GPRS counter and a common RTB counter. The TQ_COUNT with quarter bit (qbit) resolution is the GSM/GPRS counter maintained by the GSM/GPRS module to provide a system clock for the GSM/GPRS module, where the system clock is synchronized with the GSM/GPRS cellular network for transceiving information therebetween. The RTB counter with a ⅓ quarter bit resolution that is finer than that of the GSM/GPRS system clock is a common counter maintained by the processor 651 of the arbiter 605 to coordinate the timing between different RAT modules (for example, WCDMA and GSM/GPRS modules in this embodiment). As shown in FIG. 10, RTB_SYNC_GTIME_TICK represents the current count value $Count_{ref}$ of the RTB counter read in the current sync timing procedure preformed at the time SYNC_TIME_GSM, X is the frame number of a GSM frame in which the next radio activity is performed, and RTB_SYNC_GTIME_FN is the frame number of a GSM frame in which the sync timing procedure is performed. Y is an offset from the beginning of the (X)-th GSM frame to the start time of the next radio activity, and is further converted from the time scale of the TQ_COUNT counter to the time scale of the RTB counter as (Y*3/2) RTB tick (represented by the parameter 'b' for simplicity) so as to represent the corresponding count value of the RTB counter. RTB_SYNC_GTIME_EBITS is an offset from the beginning of the (RTB_SYNC_GTIME_FN)-th GSM frame to the time of performing the sync timing procedure SYNC_TIME_GSM, and is further converted from the time scale of the TQ_COUNT counter to the time scale of the RTB counter as (RTB_SYNC_GTIME_EBITS*3/2) RTB tick (represented by the parameter 'c' for simplicity) so as to represent the corresponding count value of the RTB counter. (X-RTB_ SYNC_GTIME_FN) is the difference of frame numbers between the forthcoming GSM frame which has a next radio activity and the GSM frame in which the current sync timing procedure is performed, and is further converted to the time scale of the RTB counter as ((X-RTB_SYNC_GTIME_FN)*5000*3) RTB tick (represented by the parameter 'a' for simplicity) so as to represent the corresponding count value of the RTB counter. Finally, the count value $Count_{next}$ of the next GSM radio activity represented in the time scale of the RTB counter is obtained by computing (RTB_SYNC_GTIME_TICK−c+a+b) as given in Eq. (2).

In the embodiments of the invention, the RTB software module receives and stores the reported start time $Count_{next}$ in a corresponding register, such as a 2G register 654 or 3G register 653, to indicate the start time for a forthcoming 2G or 3G radio activity. It is to be understood that the reported start time $Count_{next}$ may be alternatively stored in a specific address of a memory and the invention should not be limited thereto.

Figure 8:
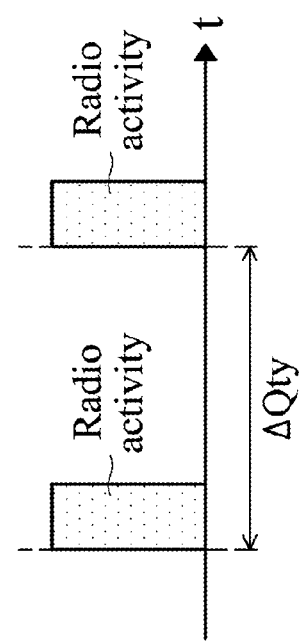
FIG. 8 is a timing diagram showing the time difference between a current radio activity and a forthcoming radio activity.

According to another embodiment of the invention, the reported start time may alternatively be represented by incremental counts up to the beginning of the forthcoming channel activity, denoted as ΔQty, as shown in FIG. 8. The RTB software module receives and adds the reported count value ΔQty to the current count value, and stores the computation result in a corresponding register, such as the 2G register 654 or 3G register 653, or a specific address of a memory, to indicate the start time for a forthcoming 2G or 3G radio activity. In some embodiments, the GSM/GPRS or WCDMA Baseband unit may alternatively issue a timing set command Set_2G_Next or Set_3G_Next carrying parameters of X, Y, RTB_SYNC_GTIME_FN or RTB_SYNC_WTIME_FN and RTB_SYNC_GTIME_EBITS or RTB_SYNC_WTIME_EBITS to the arbiter, without the RTC value synchronization therebetween as discussed above. Once receiving the timing set command, the RTB software module obtains the current time value $RTC_{count}$, accordingly calculates the absolute count value $Count_{next}$ for a 2G or a 3G channel activity, and stores the computation result in a corresponding register or a specific address of a memory.

In the embodiments of the invention, radio activities are generally represented as the activities of transceiving RF signals by using the antenna via the air interface. According to an embodiment of the invention, the radio activities performed by different RAT modules may further be grouped in two types, one is a channel activity type and the other is a measurement activity type. Channel activities, may refer to the activities for transmitting information to or receiving information from the cellular network. Since the cellular network often transmits or receives the information at a specific time according to the channel configuration, the channel activities may generally have to be performed at the specific time synchronized with the cellular network, or otherwise the information loss may happen. For example, the radio activities of listening to the system information block (SIB) channel in the WCDMA system, listening to the frequency correction channel (FCCH) in the GSM system, or the likes may be regarded as one of the channel activities. On the contrary, the measurement activities may refer to the activities that do not have to be performed at a specific time. In other words, the measurement activities may be performed any time when the RAT module determines that it is required. For example, the radio activities of power scan, frequency scan, measuring signal power of the serving cell, measuring signal power of the neighbor cell, or the likes may be regarded as one of the measurement activities. In the following paragraphs, several embodiments of coordinating the radio activities, including the channel activities and measuring activities, between different RAT modules based on the above-mentioned hardware architectures and common timing base (e.g. the RTB counter) when sharing a single antenna will be discussed in detail.

In the embodiments of the invention, the arbiter (such as the arbiter 105, 205, 305, 405, 505 or 605) may coordinate the radio activities requested by different RAT modules by using a clock (e.g. the RTB counter as previously described) with a resolution that is not necessary to be finer than that of the clocks individually used in the corresponding RAT modules as a common timing base. The arbiter or the corresponding RAT modules may convert time for the radio activities to take place onto the time scale of the common clock, as the examples show in FIG. 9 and FIG. 10. According to an embodiment of the invention, when a RAT module transmits a request for using the shared antenna to perform a current radio activity, the request may carry information regarding timing of the current radio activity and a forthcoming radio activity. As previously described, the timing information may be represented by using the time scale of the clock utilized by the requesting RAT module, or the requesting RAT module may convert the timing onto the time scale of the common clock before transmitting the timing information to the arbiter, and the invention should not be limited thereto.

Figures 12A, 12B:
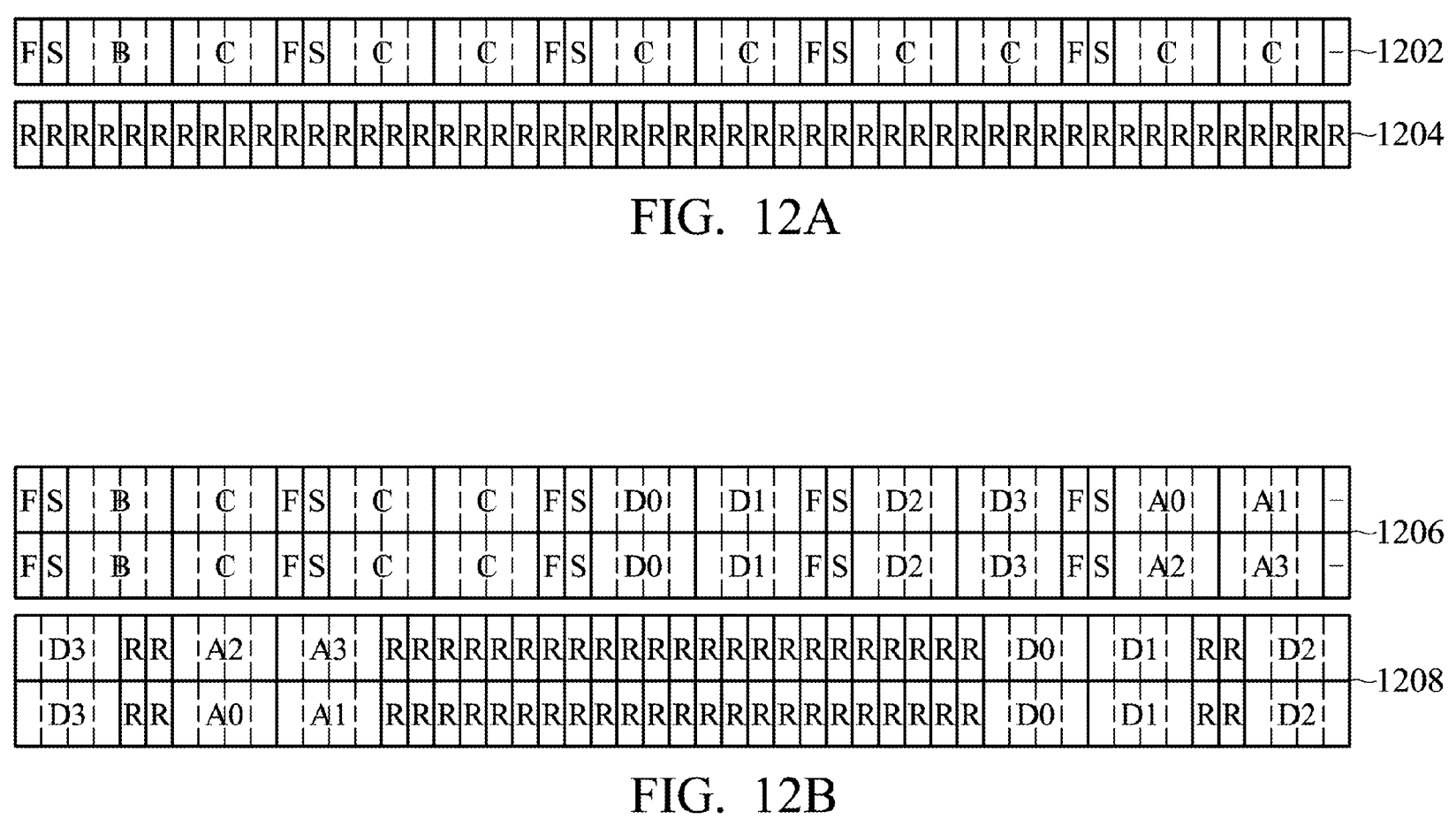

Generally, after powering on the communications apparatus, both of the RAT modules may enter an idle mode to stand by and wait for possible transmissions. In the GSM/GPRS standard, the channel organizations for the idle mode are well-defined. FIG. 12A to FIG. 12C show exemplary channel organizations in 51 multi-frames, where 1202, 1206 and 1210 are the uplink channel organizations and 1204, 1208 and 1212 are the downlink channel organizations. A multi-frame is formed having 51 consecutive TDMA frames. The F represents the Frequency Correction Channel (FCCH) which broadcasts transmission frequency correction information to the MS. The S represents the Synchronization channel (SCH) which broadcasts information to identify a base station (BS). The B represents the Broadcast Control Channel (BCCH) which broadcasts a series of information to the MS which characterizes the organization of the radio network, such as radio channel configuration (of the currently used cell as well as of the neighboring cells) information, synchronization information (frequencies as well as frame numbering), and so on. The C represents the Common Control Channel (CCCH) which is a point to multipoint signaling channel to deal with access management functions. The R represents the Random Access Channel (RACH) which is the uplink portion of the CCCH and is accessed from the MS in a cell without reservation in a competitive multiple access mode using the principle of slotted Aloha. The D0-D7 represents the Stand-alone Dedicated Control Channel (SDCCH) which is a dedicated point to point signaling channel not tied to the existence of a traffic channel (TCH) and is used for signaling between the MS and the BS when there is no active connection. The A0-A7 represents the Slow Associated Control Channel (SACCH) which carries information for optimal radio operation, e.g. commands for synchronization and transmitter power control and reports on channel measurements.

Figure 13:
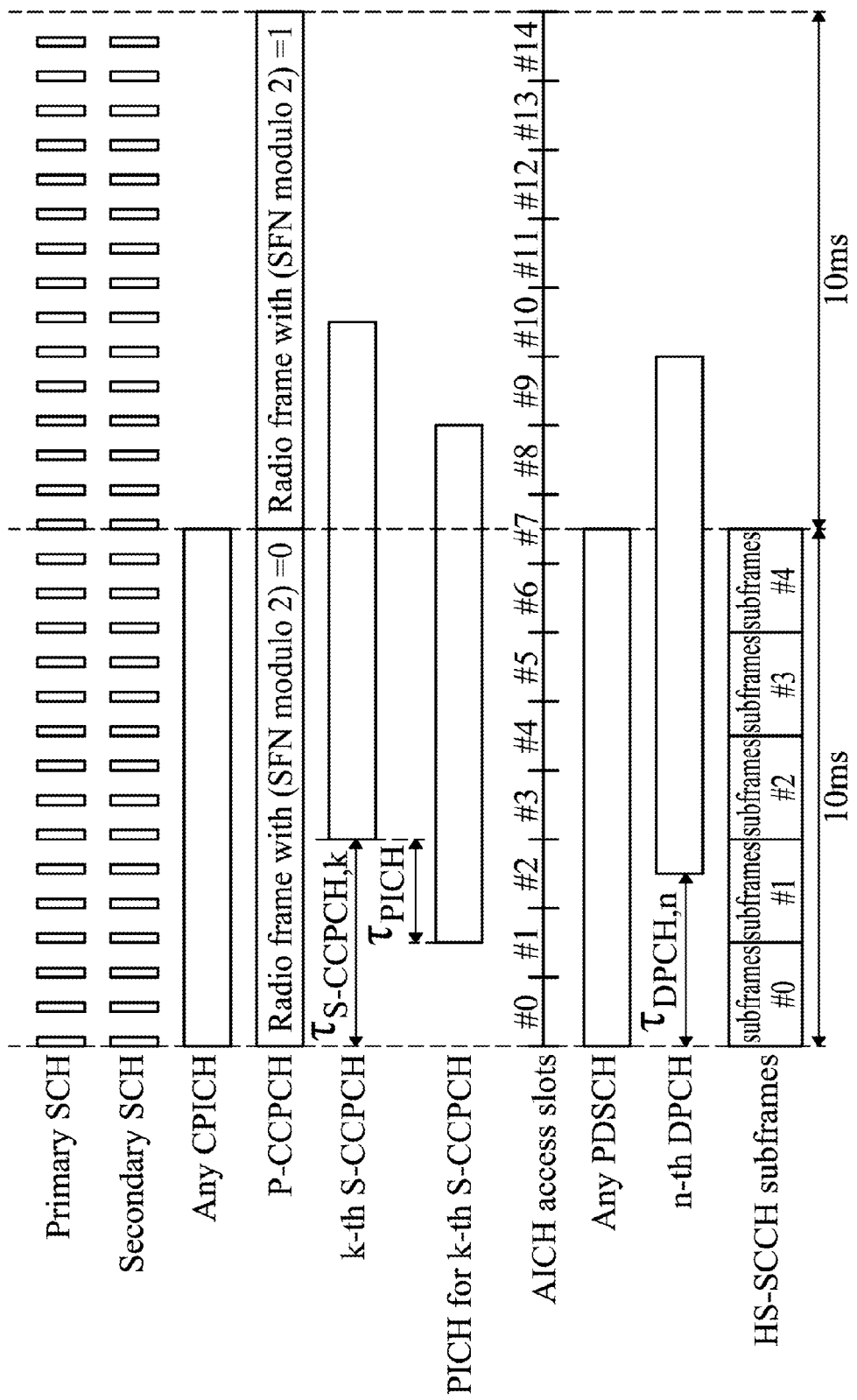
FIG. 13 shows another exemplary channel organizations for WCDMA.

For the WCDMA standard, the channel organizations for an idle mode are also well-defined. FIG. 13 shows exemplary channel organizations for the WCDMA systems. The Synchronization Channel (SCH) is the channel needed for the cell search. It consists of two channels, a primary and secondary synchronization channel. The Common Pilot Channel (CPICH) is an unmodulated code channel, which is scrambled with the cell-specific primary scrambling code. The function of the CPICH is to aid in channel estimation at the terminal for the dedicated channel and to provide a channel estimation reference for the common channels when they are not associated with the dedicated channels or not involved in the adaptive antenna techniques. The Primary Common Control Physical Channel (P-CCPCH) is the physical channel carrying the Broadcast Channel (BCH). It needs to be demodulated by all the terminals in the system. The Secondary Common Control Physical Channel (S-CCPCH) carries two different common transport channels: the Forward Access Channel (FACH) and the Paging Channel (PCH). The two channels can share a single Secondary CCPCH or can use different physical channels. Basically, in a minimum configuration, each cell has at least one Secondary CCPCH. As shown in FIG. 13, the offset between the Primary CCPCH (P-CCPCH) and the k-th Secondary CCPCH (S-CCPCH) is $\tau_{S\text{-}CCPCH,k}$. The Paging Channel (PCH) is operated together with the Paging Indicator Channel (PICH) to provide terminals with efficient sleep mode operation. As shown in FIG. 13, the offset between PICH and the k-th S-CCPCH is $\tau_{PICH}$. The Acquisition Indicator Channel (AICH) is used to indicate the reception of the random access channel signature sequence from the base station, to the MS. The Physical Downlink Shared Channel (PDSCH) is the physical channel carrying the downlink shared channel (DSCH). The DSCH is a transport channel intended to carry dedicated user data and/or control information. As shown in FIG. 13, the offset between any PDSCH and n-th Dedicated Physical Channel (DPCH) is $\tau_{DPCH,n}$. The high-speed shared control channel (HS-SCCH) carries the key information necessary for High-speed Downlink Shared Channel (HS-DSCH) demodulation.

Referring back to the communications apparatuses as shown in FIG. 1, FIG. 2, FIG. 3, FIG. 4 or FIG. 5, based on the architecture of using a single antenna shared between different RAT modules, methods for scheduling channel activities when collision between different RAT modules occurs are proposed. According to the embodiments of the invention, each RAT module with a communications interface conforming to a corresponding wireless communications protocol transmits and receives radio frequency (RF) signals in a corresponding cellular network through the shared antenna. When the RAT module attempts to perform a transmission (Tx) or receipt (Rx) channel activity, the corresponding Baseband unit as shown in any of FIG. 1 to FIG. 5 may transmit a request to the arbiter asking for permission to use the shared antenna. Once the request is granted, a corresponding Baseband unit can control the switching devices as shown in any of FIG. 1 to FIG. 5 to transceive RF signals from or to the cellular network through the air interface.

Figure 14A:
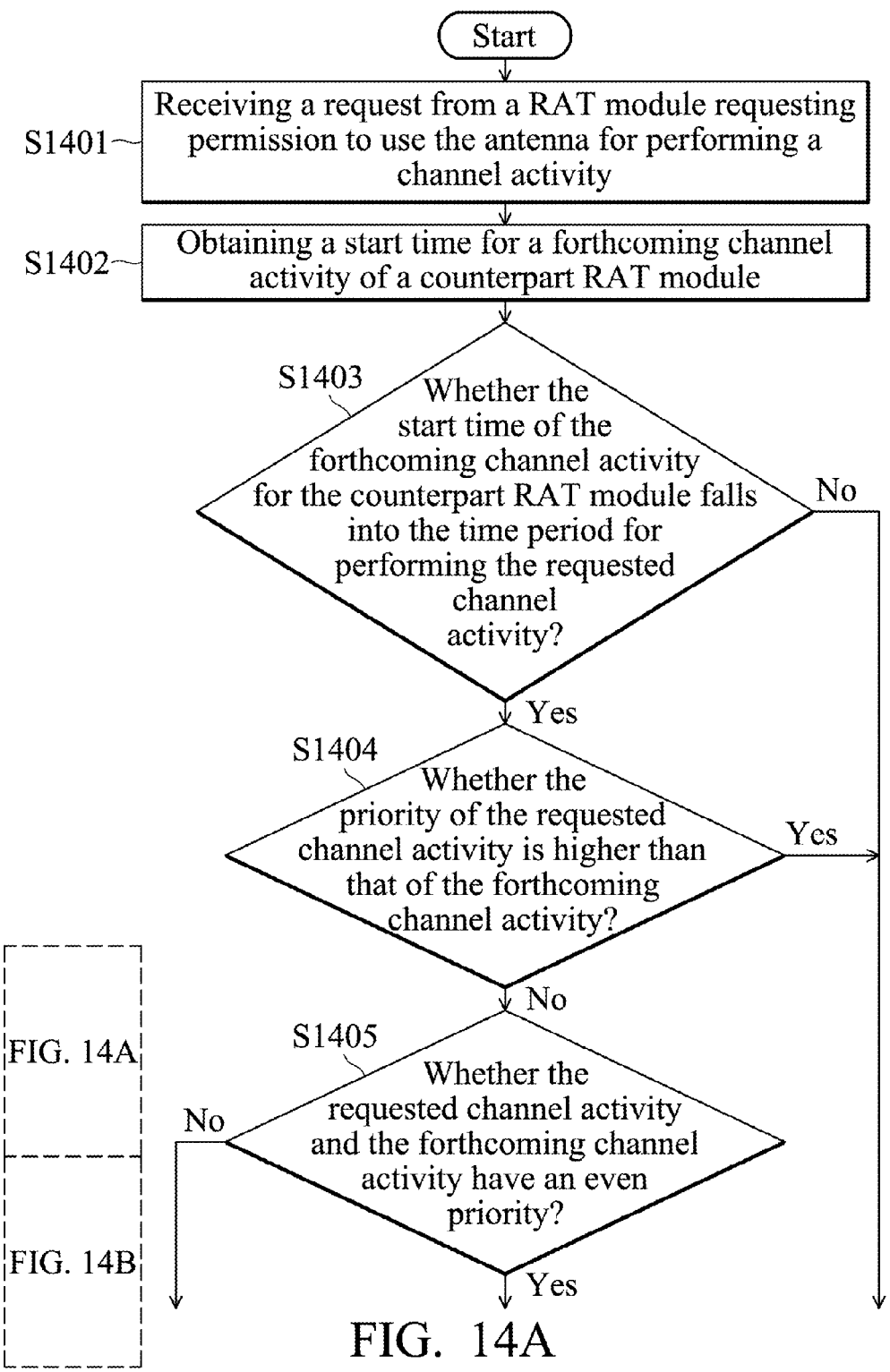
FIG. 14A and FIG. 14B are the flow chart showing the method for scheduling channel activities for multiple radio access technologies (RAT) in a communications apparatus as shown in FIG. 1 to FIG. 5 according to an embodiment of the invention.
Figure 14B:
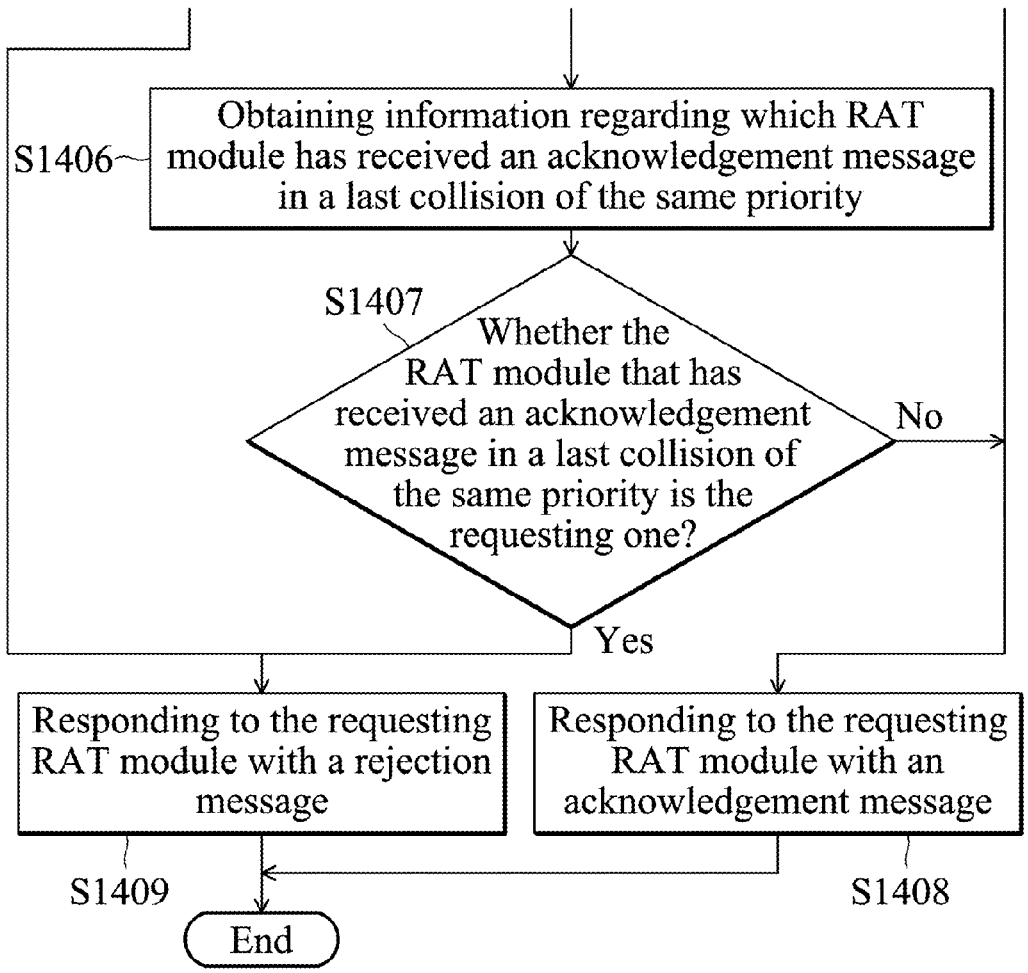

FIG. 14A and FIG. 14B show the flow chart of the method for scheduling channel activities for multiple radio access technologies (RAT) in a communications apparatus as shown in any of FIG. 1 to FIG. 5, according to an embodiment of the invention. Once the arbiter (such as the arbiter 105, 205, 305, 405, 505 or 605) receives a request from a RAT module (for example, the WCDMA module) requesting permission to use the antenna for performing a channel activity (Step S1401), the RTB software module obtains a start time for a forthcoming channel activity of a counterpart RAT module (for example, the GSM/GPRS module) (Step S1402). According to the embodiments of the invention, the timing information carried in the request may comprise a start time and/or duration of the current radio activity and start time of the forthcoming radio activity, where the start time and duration may be represented in a form of the above-mentioned count value. Therefore, the arbiter may store the corresponding timing information in a corresponding register as shown in FIG. 6, or a memory or storage device disposed inside or outside of the arbiter for future use after receiving the request, and may further retrieve the timing information therefrom when required. Next, the arbiter determines whether the start time of the forthcoming channel activity for the counterpart RAT module falls into the time period for performing the requested channel activity (Step S1403). Note that the requested time period may be represented by a range of count values, and the RTB software module determines whether the obtained count value indicating the start time falls into the requested range. When the start time of the forthcoming channel activity does not fall into the time period for performing the requested channel activity, the arbiter may directly respond to the requesting RAT module with an acknowledgement message (Step S1408), to enable the RAT module to perform the requested channel activity via the antenna.

When the start time of the forthcoming channel activity falls into the time period for performing the requested channel activity, the arbiter further obtains a priority configuration for the requested channel activity versus the forthcoming channel activity, and determines whether the priority of the requested channel activity is higher than that of the forthcoming channel activity (Step S1404). FIG. 15 is a table showing an exemplary priority configuration for the WCDMA and GSM/GPRS channels. According to the embodiment of the invention, the priority configuration may be stored in a memory or storage device disposed inside or outside of the arbiter, and is configured depending on different system requirements. The priorities given to the channels may be ranked in a descending order from Top, High, Medium 1 (M1), Medium 2 (M2), Medium 3 (M3), to Low. When the requested channel activity has a higher priority than that of the forthcoming channel activity, for example, the priority of the requested channel activity is Top while that of the forthcoming channel activity is High, the arbiter would respond to the requesting RAT module with an acknowledgement message (Step S1408), to enable the RAT module to perform the requested channel activity via the antenna. When the requested channel activity does not have a higher priority than that of the forthcoming channel activity, the arbiter would then determine whether the requested channel activity and the forthcoming channel activity have an even priority (Step S1405). When the requested channel activity and the forthcoming channel activity do not have an even priority, it means that the requested channel activity has a priority lower than that of the forthcoming channel activity. For example, if the priority of the requested channel activity is High while the priority of the forthcoming channel activity is Top, the arbiter would then respond to the requesting RAT module with a rejection message (Step S1409), to prevent the RAT module from performing the requested channel activity via the antenna. The requested channel activity is therefore abandoned by the requesting RAT module after receiving the rejection message from the arbiter.

When the requested channel activity and the forthcoming channel activity have an even priority, the arbiter may further obtain information regarding which RAT module has received an acknowledgement message in a last collision of the same priority (Step S1406), and determine whether the RAT module that has received an acknowledgement message in a last collision of the same priority is the requesting one (Step S1407). According to the embodiments of the invention, in order to evenly schedule the collided channel activity, the permission to use the antenna is given to the RAT module which did not receive the acknowledgement message in the last collision. Therefore, when the RAT module that has received an acknowledgement message in a last collision of the same priority is the requesting RAT module, the arbiter responds to the requesting RAT module with a rejection message (Step S1409), to prevent the RAT module from performing the requested channel activity via the antenna. When the RAT module that has received an acknowledgement message in a last collision of the same priority is not the requesting RAT module, the arbiter responds to the requesting RAT module with an acknowledgement message (Step S1408), to enable the RAT module to perform the requested channel activity via the antenna. Note that information regarding decision for the last collision of each priority may be stored by flags or symbols in a memory or storage device disposed inside or outside of the arbiter. Several flags or symbols may be stored as the information, such as collision types of "TOP", "HIGH", "M1", "M2", "M3" and "LOW" as shown in the table of FIG. 15. With reference to the table of priority configuration as shown in FIG. 15, a collision type may mean the priority of the collided channel activity. For example, the collision type of the GSM paging channel (PCH) versus WCDMA paging indication channel (PICH) is High.

Figure 16:
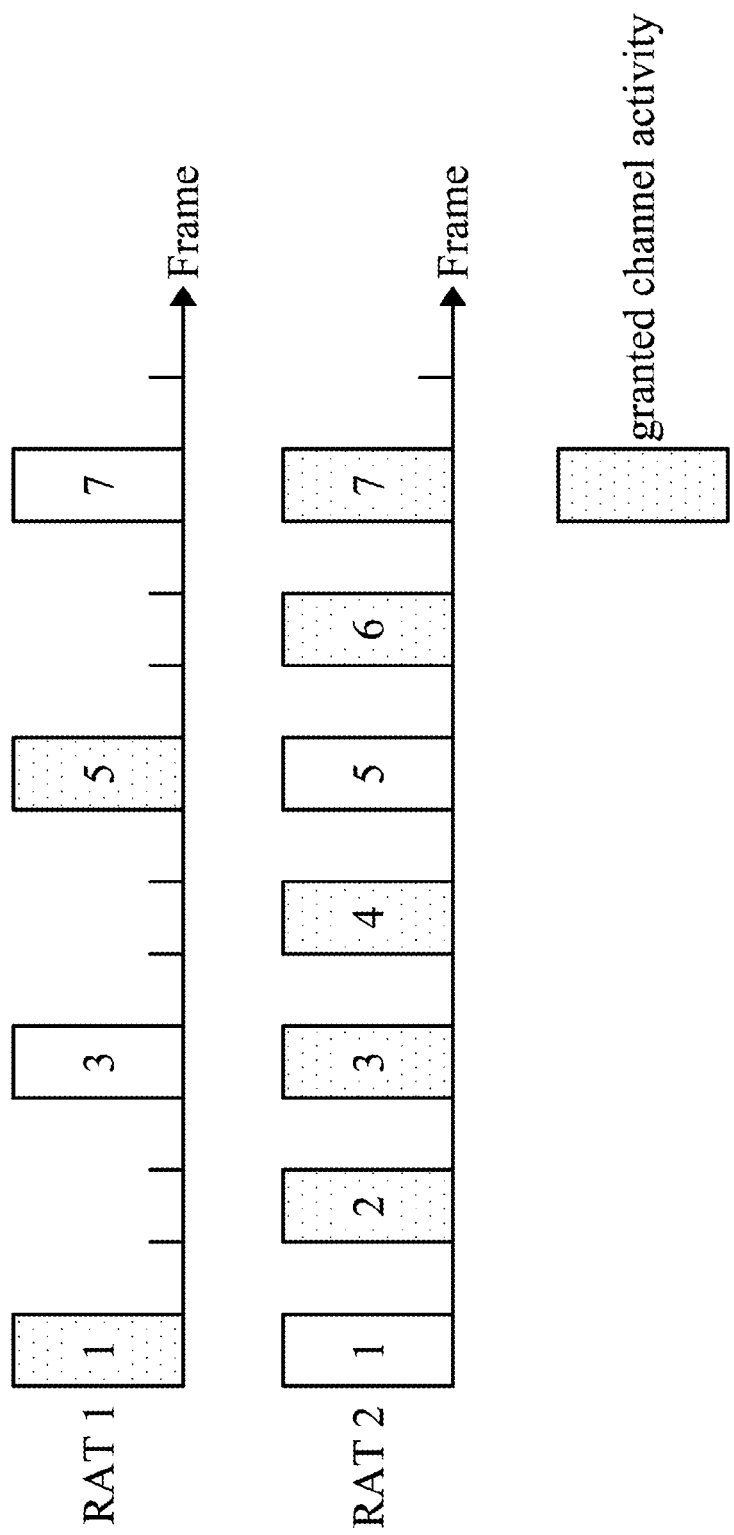
FIG. 16 is a timing diagram showing the channel activities of two RAT modules according to an embodiment of the invention.
Figure 17:
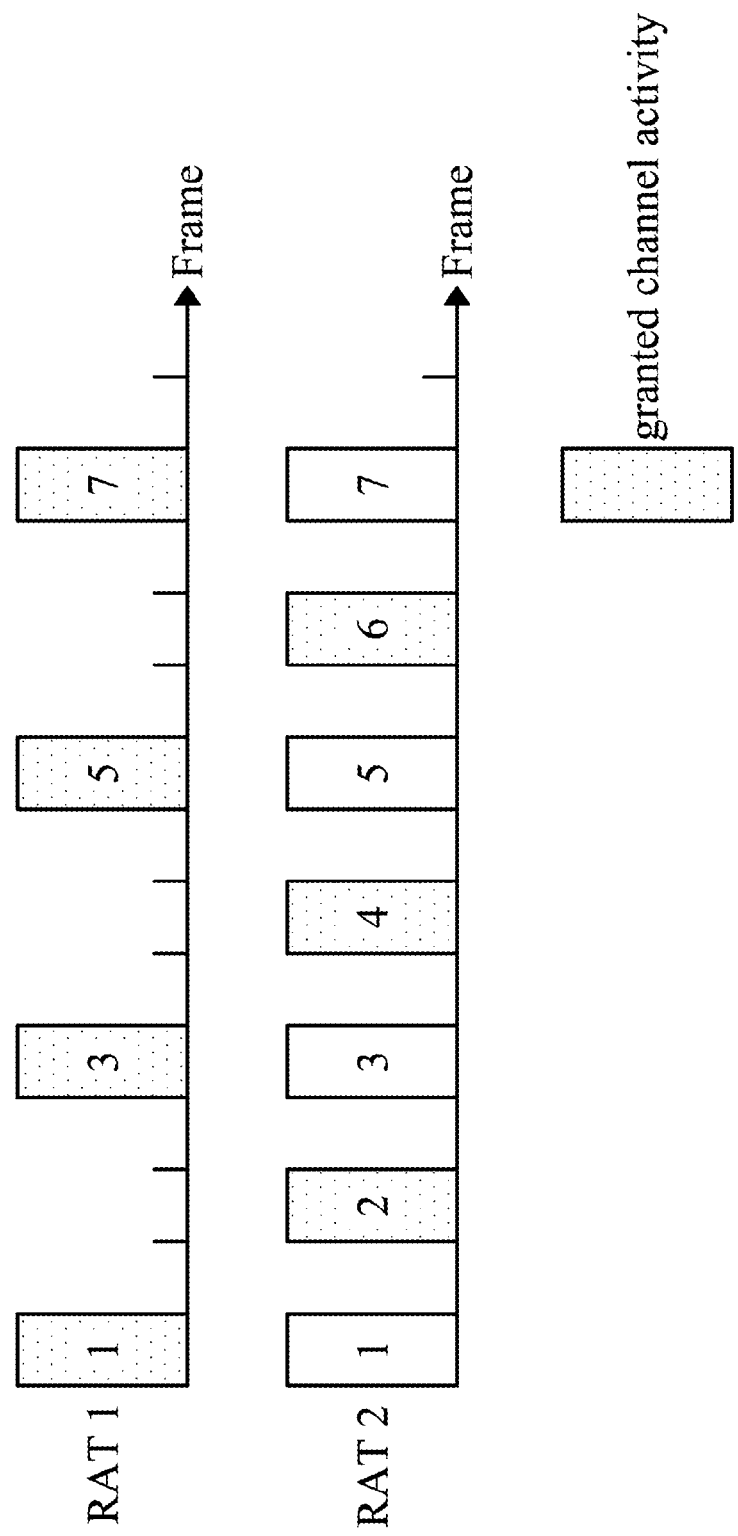
FIG. 17 is a timing diagram showing the channel activities of two RAT modules according to another embodiment of the invention.

It is to be understood that the criterion adopted in steps S1406 and S1407 when the collided channel activities have even priority may be flexibly designed according to different system requirements. For example, in some situations, the criterion as recited in steps S1406 and S1407 may not result in satisfactory channel configurations. FIG. 16 is a timing diagram showing the channel activities of two RAT modules according to an embodiment of the invention, where the channel activities of a specific channel of RAT 1 are supposed to be performed in radio frames 1, 3, 5 and 7, and the channel activities of a specific channel of RAT 2 are supposed to be performed in radio frames 1, 2, 3, 4, 5, 6 and 7. Therefore, the channel activities of RAT 1 and RAT 2 collide with each other in radio frames 1, 3, 5 and 7. Based on the criterion previously described in steps S1406 and S1407, when collision occurs in radio frames 3 and 7, the arbiter may give the permission to use the antenna to RAT 2 since the permission is given to RAT 1 in the last collision in radio frames 1 and 5. The resulting granted channel activities are shown as the channel activities filled with dots in FIG. 16. However, since the RAT 2 may also perform the corresponding channel activity in radio frames 2, 4 and 6 that does not collide with the channel activities of RAT 1, the resulting channel activities are actually not evenly scheduled. Therefore, according to another embodiment of the invention, the criterion adopted in steps S1406 and S1407 may also be replaced by determining which RAT module has most recently performed the collided channel activity, and granting (e.g. responding the acknowledgement message to) the RAT module other than the one that has most recently performed the collided channel activity. FIG. 17 is a timing diagram showing the channel activities of two RAT modules arranged by the above-mentioned criterion according to another embodiment of the invention. Similar to the example shown in FIG. 16, the channel activities of a specific channel of RAT 1 are supposed to be performed in radio frames 1, 3, 5 and 7, and the channel activities of a specific channel of RAT 2 are supposed to be performed in radio frames 1, 2, 3, 4, 5, 6 and 7. When collisions occur in frame 3, 5 and 7, the arbiter gives the permission to use the antenna to RAT 1 rather than RAT 2 since RAT 2 has most recently performed the collided channel activity in frame 1, 3 and 5. Therefore, the resulting granted channel activities are more evenly distributed among RAT 1 and RAT 2 when compared to the example shown in FIG. 16. Note that information regarding the recently performed channel activity and the corresponding RAT module may also be stored by flags or symbols in a memory or storage device disposed inside or outside of the arbiter. According to yet another embodiment of the invention, the criterion adopted in steps S1406 and S1407 may also be replaced by alternately granting the RAT modules to use the shared antenna by using a round-robin mechanism when collision occurs.

Referring back to FIG. 15, channel types of the requested channel activities and corresponding priorities presented in the table therein are described as follows. The WCDMA Baseband unit may send a request for a channel activity with a channel type of P-CCPCH_high when attempting to listen to a WCDMA Primary Common Control Physical Channel (P-CCPCH) of neighboring and serving cells in cell reselection or cell selection. According to an embodiment of the invention, since information of the P-CCPCH transmitted in successive radio frames has to be received without interruption, the channel type P-CCPCH_high is given a Top priority, which is the highest among the other channels shown in FIG. 15. Next, the High priority is given to the PICH for the WCDMA systems and PCH for the GSM/GPRS systems since paging contains important information that is not supposed to be lost. Note that the NBCCH channel type is also given a High priority when the GSM/GPRS Baseband unit attempts to listen to GSM BCCH channels of neighboring cells in cell reselection. Next, the Medium 1 (M1) priority is given to the BCCH and AGCH (Access Grant Channel) for the GSM/GPRS systems, and the Medium 2 (M2) priority is given to the P-CCPCH_med for the WCDMA systems. The P-CCPCH_med channel type is sent when the WCDMA Baseband unit attempts to listen to the SFN channel of neighboring and serving cells. The Medium 3 (M3) priority is given to the CBCH (Cell Broadcast Channel) for the GSM/GPRS systems and the CTCH (Common Traffic Channel) for the WCDMA systems, for supporting short message services (SMS). Finally, the Low priority is given to the "FCB+SB/SCH/NBCCH" channel type for the GSM/GPRS systems and the P-CCPCH_low channel type for the WCDMA systems. The GSM/GPRS Baseband unit sends a request with a "FCB+SB/SCH/NBCCH" channel type when attempting to listen to the GSM FCCH and SCH for synchronization with the BS as discussed above, or when attempting to listen to the GSM BCCH of neighboring cells not in cell reselection. The WCDMA Baseband unit sends a request with a P-CCPCH_low channel type when the WCDMA Baseband unit attempts to listen to the WCDMA P-CCPCH in a PLMN search manually activated by a user.

Note that according to the embodiments of the invention, the arbiter may dynamically adjust the priority of different channel types based on a current environment or channel conditions. Therefore, the table shown in FIG. 15 is only one exemplary priority configuration for the WCDMA and GSM/GPRS channels and the invention should not be limited thereto. Note also that for those with ordinary skill in the art, it is easy to deduce other priority configurations for various RAT modules with a communications interface conforming to a wireless communications protocol other than the previously introduced ones based on the above-mentioned concept, and the invention should not be limited thereto.

Figure 11:
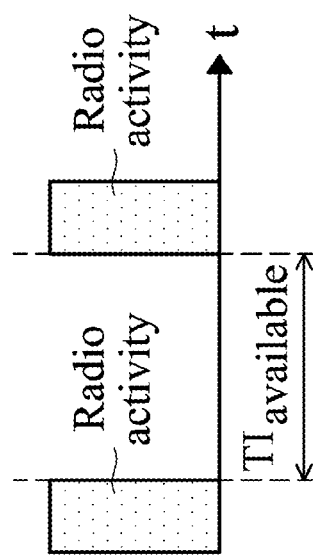
FIG. 11 is a timing diagram showing the available time interval between two radio activities.

According to further an embodiment of the invention, after a radio activity is completed, a corresponding Baseband unit may tick the RTB software module or transmit an indication signal to the RTB software module to inform the RTB software module that the radio activity has been completed. When ticked or after the indication signal is received, the RTB software module may calculate the above-mentioned available time interval, as the $TI_{available}$ shows in FIG. 11, from the completion of the current channel activity till the beginning of a forthcoming radio activity to be performed. Therefore, according an embodiment of the invention, the arbiter may monitor the channel activity of the RAT module receiving the acknowledgement message, and estimate an available time interval to a nearest forthcoming channel activity when being ticked or after the indication signal is received, indicating completion of the channel activity. The arbiter may further determine whether a duration for performing the collided channel activity, which has been abandoned, fits within the available time interval, and transmit an acknowledgement message to the RAT module that has received the rejection message for the collided channel activity when the duration for performing the collided channel activity fits within the available time interval. As previously described, the duration for performing the requested channel activity may be represented by a range of count values, and the RTB software module may accordingly determine whether the requested range fits within (i.e. not longer than) the available time interval. Thus, once the previous channel activity finishes earlier than it supposed to, there is a chance for the abandoned channel activity to be performed during the available time interval. According to the embodiment of the invention, a message Nfy_Avail_Time as shown in FIG. 2 to FIG. 6 may be sent to notify the corresponding Baseband unit of the available time interval. Therefore, the notified Baseband unit may direct its corresponding RF unit to arrange performing of a previously abandoned channel activity during the available time interval $TI_{available}$.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus with multiple radio access technologies (RATs), comprising:
   a first RAT module, with a first communications interface conforming to a first wireless communications protocol and transceiving radio frequency (RF) signals in a first cellular network through an antenna;
   a second RAT module, with a second communications interface conforming to a second wireless communications protocol, which is different from the first wireless communications protocol, and transceiving RF signals in a second cellular network through the antenna; and
   an arbiter, receiving a first request from the first RAT module, requesting permission to use the antenna for a first channel activity, receiving a second request from the second RAT module, requesting permission to use the antenna for a second channel activity, obtaining a priority configuration for the first channel activity versus the second channel activity when the second channel activity collides with the first channel activity, and responding to one of the first second RAT modules with an acknowledgement message and to the other of the first second RAT modules with a rejection message based on the obtained priority configuration,
   wherein the first or second request carries timing information regarding a start time and duration of the first or second channel activity, and the arbiter determines whether the second channel activity collide with the first channel activity according to the timing information;
   wherein the first or second request further carries timing information regarding a start time of a forthcoming first/second channel activity, and the arbiter further receives an indication signal from the first RAT module receiving the acknowledgement message, indicating that a corresponding channel activity has been completed, estimates an available time interval up to a nearest forthcoming first/second channel activity to be performed, and transmits an acknowledgement message to the second RAT module that has received the rejection message for the collided channel activity when the duration for performing the collided channel activity fits within the available time interval, to enable the second RAT module to perform the collided channel activity via the antenna during the available time interval.

2. The communications apparatus as claimed in claim 1, wherein when the first channel activity has a priority which is higher than that of the second channel activity, the arbiter transmits the acknowledgement message to the first RAT module and transmits the rejection message to the second RAT module to enable the first RAT module to perform the first channel activity via the antenna and prevent the second RAT module from performing the second channel activity.

3. The communications apparatus as claimed in claim 1, wherein when the first and second channel activities have a same priority, the arbiter further obtains information regarding the first RAT module or the second RAT module has received an acknowledgement message in a last collision of the same priority, and transmits the acknowledgement message to the first RAT module or the second RAT module which did not receive the acknowledgement message in the last collision.

4. The communications apparatus as claimed in claim 1, wherein when the first and second channel activities have an even priority, the arbiter further determines the first RAT module or the second RAT module has most recently performed the collided channel activity, and transmits the acknowledgement message to the first RAT module or the second RAT module other than the one that has most recently performed the collided channel activity.

5. The communications apparatus as claimed in claim 1, wherein when the first channel activity has a priority lower than that of the second channel activity, the arbiter transmits the acknowledgement message to the second RAT module and the rejection message to the first RAT module to enable the second RAT module to perform the second channel activity via the antenna and prevent the first RAT module from performing the first channel activity.

6. A method for scheduling channel activities for multiple radio access technologies (RATs) in a communications apparatus comprising an antenna, an arbiter and at least a first RAT module and a second RAT module sharing the antenna to perform corresponding channel activities, comprising:
   receiving, by the arbiter, a request for requesting permission to use the antenna for a first channel activity for the first RAT module;
   obtaining, by the arbiter, a priority configuration for the first channel activity versus a forthcoming second channel activity when the first channel activity collides with the forthcoming second channel activity to be performed by the second RAT module; and responding, by the arbiter, to the first RAT module by sending an acknowledgement message or a rejection message to the first RAT module based on the obtained priority configuration to indicate whether the request has been granted;

when the first channel activity and the forthcoming second channel activity have a same priority, obtaining, by the arbiter, information regarding whether the first RAT module has received an acknowledgement message in a last collision of the same priority;

responding, by the arbiter, with the acknowledgement message to the first RAT module when the first RAT module did not receive the acknowledgement message in the last collision; and responding, by the arbiter, with the rejection message to the first RAT module when the first RAT module has received the acknowledgement message in the last collision;

receiving, by the arbiter, an indication signal from the first RAT module indicating that the first channel activity has been completed after the first RAT module has received the acknowledgement message for performing the first channel activity;

estimating, by the arbiter, an available time interval up to a nearest channel activity to be performed; and transmitting an acknowledgement message to the second RAT module when the duration for performing the forthcoming second channel activity, which collides with the first channel activity, fits within the available time interval, to enable the second RAT module to perform the forthcoming second channel activity via the antenna during the available time interval.

7. The method as claimed in claim 6, wherein the request carries timing information regarding a start time and a duration of the first channel activity, and collision of the first and the forthcoming second channel activities is determined when a start time of the forthcoming second channel activity falls into the duration of the first channel activity.

8. The method as claimed in claim 7, wherein information regarding the start time of the forthcoming second channel activity is obtained from a register, a memory or a storage device.

9. The method as claimed in claim 6, wherein the responding step further comprises:
when the first channel activity has a priority which is higher than that of the forthcoming second channel activity, transmitting the acknowledgement message to the first RAT module, to enable the first RAT module to perform the first channel activity via the antenna.

10. The method as claimed in claim 6, wherein the responding step further comprises:
when the first channel activity has a priority which is lower than that of the forthcoming second channel activity, transmitting the rejection message to the first RAT module, to prevent the first RAT module from performing the first channel activity.

11. The method as claimed in claim 6, wherein the request further carries timing information regarding a start time of the next first channel activity, the method further comprising:
storing, by the arbiter, information regarding the start time of the next first channel activity.

12. A method for scheduling channel activities for multiple radio access technologies (RATs) in a communications apparatus comprising an antenna, an arbiter and at least a first RAT module and a second RAT module sharing the antenna to perform corresponding channel activities, comprising:

receiving, by the arbiter, a request for requesting permission to use the antenna for a first channel activity for the first RAT module;

obtaining, by the arbiter, a priority configuration for the first channel activity versus a forthcoming second channel activity when the first channel activity collides with the forthcoming second channel activity to be performed by the second RAT module; and responding, by the arbiter, to the first RAT module by sending an acknowledgement message or a rejection message to the first RAT module based on the obtained priority configuration to indicate whether the request has been granted, wherein the responding step further comprises:

when the first channel activity and the forthcoming second channel activity have a same priority, determining, by the arbiter, whether the first RAT module has most recently performed the collided channel activity than the second RAT module;

responding, by the arbiter, with the acknowledgement message, to the first RAT module when the second RAT module has most recently performed the collided channel activity than the first RAT module; and responding, by the arbiter, with the resection message, to the first RAT module when the first RAT module has most recently performed the collided channel activity than the second RAT module;

receiving, by the arbiter, an indication signal from the first RAT module indicating that the first channel activity has been completed after the first RAT module has received the acknowledgement message for performing the first channel activity;

estimating, by the arbiter, an available time interval up to a nearest channel activity to be performed; and transmitting an acknowledgement message to the second RAT module when the duration for performing the forthcoming second channel activity, which collides with the first channel activity, fits within the available time interval, to enable the second RAT module to perform the forthcoming second channel activity via the antenna during the available time interval.

13. A communications apparatus with multiple radio access technologies (RATs), comprising:
a first RAT module, with a first communications interface conforming to a first wireless communications protocol and transceiving radio frequency (RF) signals in a first cellular network through an antenna;
a second RAT module, with a second communications interface conforming to a second wireless communications protocol, which is different from the first wireless communications protocol, and transceiving RF signals in a second cellular network through the antenna; and
an arbiter, receiving a request from the first RAT module, requesting permission to use the antenna for a first channel activity, obtaining a priority configuration for the first channel activity versus a second channel activity to be performed by the second RAT module when the second channel activity collides with the first channel activity, and responding to the first RAT module with an acknowledgement message or a rejection message based on the obtained priority configuration;
wherein the first or second request further carries timing information regarding a start time of a forthcoming first or second channel activity, and the arbiter further receives an indication signal from the RAT first module receiving the acknowledgement message, indicating that a corresponding channel activity has been completed, estimates an available time interval up to a nearest forthcoming first or second channel activity to be performed, and transmits an acknowledgement message to the second RAT module that has received the rejection message for the collided channel activity when the duration for performing the collided channel activity fits within the available time interval, to enable the second RAT module to perform the collided channel activity via the antenna during the available time interval.

14. The communications apparatus as claimed in claim 13, wherein the arbiter responds to the first RAT module with the acknowledgement message when the request indicates that the first RAT module attempts to listen to a WCDMA Primary Common Control Physical Channel of neighboring and serving cells in cell reselection or cell selection.

15. The communications apparatus as claimed in claim 13, wherein the arbiter responds to the first RAT module with the rejection message when the request indicates that the first RAT module attempts to listen to a WCDMA Primary Common Control Physical Channel in a public land mobile network search manually activated by an user.

16. The communications apparatus as claimed in claim 13, wherein the arbiter responds to the first RAT module with the acknowledgement message to enable the first RAT module to perform the first channel activity via the antenna when the first channel activity has a priority which is higher than that of the forthcoming second channel activity.

* * * * *